(12) United States Patent
Woo et al.

(10) Patent No.: US 8,374,180 B2
(45) Date of Patent: Feb. 12, 2013

(54) DIGITAL BROADCASTING SYSTEM AND METHOD OF PROCESSING DATA IN DIGITAL BROADCASTING SYSTEM

(75) Inventors: Sang Rea Woo, Goyang-si (KR); Chang Ho Shin, Osan-si (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 12/605,782

(22) Filed: Oct. 26, 2009

(65) Prior Publication Data

US 2011/0096779 A1    Apr. 28, 2011

(51) Int. Cl.
*H04L 12/56* (2006.01)
*H04N 7/173* (2011.01)
*H04N 7/18* (2006.01)

(52) U.S. Cl. .......... 370/390; 370/401; 725/78; 725/110

(58) Field of Classification Search .................. 370/389, 370/395.4, 473, 537; 725/78, 91, 110; 348/14.01
See application file for complete search history.

(56) References Cited

U.S. PATENT DOCUMENTS

| | | | | |
|---|---|---|---|---|
| 5,822,324 A * | 10/1998 | Kostresti et al. | ............. | 370/487 |
| 6,081,830 A * | 6/2000 | Schindler | ...................... | 709/204 |
| 6,486,907 B1 * | 11/2002 | Farber et al. | ................... | 725/78 |
| 6,600,958 B1 | 7/2003 | Zondag | | |
| 6,622,307 B1 * | 9/2003 | Ho | ............................. | 725/120 |
| 7,352,991 B2 * | 4/2008 | Novak et al. | ................. | 455/3.02 |
| 7,525,993 B2 * | 4/2009 | Yousef | .......................... | 370/473 |
| 7,577,982 B2 * | 8/2009 | Jo | ............................... | 725/139 |
| 7,817,642 B2 * | 10/2010 | Ma et al. | .................... | 370/395.4 |
| 7,908,622 B1 * | 3/2011 | Blevins | ........................... | 725/78 |
| 8,046,806 B2 * | 10/2011 | Wall et al. | ...................... | 725/78 |
| 2003/0074405 A1 * | 4/2003 | Nomura et al. | ............... | 709/204 |
| 2004/0172652 A1 * | 9/2004 | Fisk et al. | ........................ | 725/78 |
| 2005/0091157 A1 * | 4/2005 | Suzuki et al. | ................... | 705/40 |
| 2006/0290775 A1 * | 12/2006 | Horii et al. | ................. | 348/14.01 |
| 2007/0074256 A1 * | 3/2007 | Jung et al. | ..................... | 725/100 |
| 2007/0098007 A1 * | 5/2007 | Prodan et al. | ................. | 370/443 |
| 2007/0217436 A1 | 9/2007 | Markley | | |
| 2007/0289022 A1 * | 12/2007 | Wittkotter | ....................... | 726/27 |
| 2008/0115182 A1 * | 5/2008 | van Willigenburg | ........ | 725/110 |
| 2008/0298302 A1 * | 12/2008 | Ishida | ........................... | 370/328 |
| 2008/0301744 A1 * | 12/2008 | Hutchings | ..................... | 725/110 |
| 2009/0106801 A1 * | 4/2009 | Horii | ................................ | 725/91 |
| 2010/0296511 A1 * | 11/2010 | Prodan et al. | ................. | 370/389 |

FOREIGN PATENT DOCUMENTS

| | | |
|---|---|---|
| KR | 10-2003-0056876 | 7/2003 |
| WO | WO 2004/081713 | 9/2004 |

* cited by examiner

*Primary Examiner* — Hassan Kizou
*Assistant Examiner* — Emmanuel Maglo
(74) *Attorney, Agent, or Firm* — McKenna Long & Aldridge LLP

(57) ABSTRACT

A method is provided for controlling a management server that is connected to a DTV through an IP connection, wherein the DTV is located in one independent space among a plurality of independent spaces physically separated from one another. The method including generating a message file including an Application Programming Interfaces (API) command and a parameter related to a display condition, accessing an IP address of a DTV serving as a destination of the generated message file, transmitting, if the accessing is successfully achieved, the generated message file to the DTV having the accessed IP address and receiving information for identifying whether the message file is successfully processed from the DTV.

3 Claims, 20 Drawing Sheets

```
<message_Ver> 35 </message_Ver>
<message_No> 3 </message_No>
<message_Items>
        <content> Dear Mr. Shin, Thanks for visiting Hilton </content>
        <additionalInfo> 7 <additionalInfo>   /* direction to information page */
        <startTime>13/37/00 </startTime>
        <startDate>2009/09/15</startDate>
        <repeatType> 0 </repeartType>/* once:0 everyday:1 Mon~Fri:2
Sat~Sun:3 */
    <messageType> 1 </messageType>  /* normal msg:0 welcome msg:1, fire
alarm:2 ,etc. */
        <exposureSeconds> 1600 </exposureSeconds>
        <position> bot </position>
        <font> 3 </font>
        <fontSize> 20 </fontSize>
        <letterColor> 100/100/100 </letterColor>
        <BGColor> 255/255/255</BGColor>
        <alpha> 2 </alpha>              /* transparency level */
        ....
</message_Items>
```

FIG. 15 package org. ad;

import java.awT.Color;
import java.awt.Font;

publick interface BannerAttribute {

/* location of message */
public final static int TOP = 1;
public final static int BOTTOM = 2;

/* mode of message */
public final static int STATIC = 1;
public final static int SLIDE = 2;

abstract public int getReatCount () ;
abstract public int getDelay () ;
abstract public Font getFont () ;
abstract public int getAlpha () ;
abstract public int getLocation () ;
abstract public int getDisplayMode () ;
abstract public int getSlideTime () ;

FIG. 16

```
package org. ad;

public abstract class BannerManager {

/* state of message */
    public final static int MEEASG_NOT_READY_STATE = 1;
    public final static int MESSAGE_READY_STATE = 2;
    public final static int MESSAGE_IN_PROGRESS_STATE = 3;
    public final static int MESSAGE_PAUSE_STATE = 3;

public static Bannermanager getInstance () {
    return mull;
    }
    abstract public void setBanner (BannerAttribute banner) ;
    abstract public BannerAttribute getBanner () ;
    abstract public void showMessage ();
    abstract public void hidemessage () ;
    abstract public void pawseMessage () ;
    abstract public void resumeMessage () ;
    abstract public int getState () ;
}
```

DIGITAL BROADCASTING SYSTEM AND METHOD OF PROCESSING DATA IN DIGITAL BROADCASTING SYSTEM

BACKGROUND OF THE INVENTION

1. Field of the Invention

The present invention relates to a technology for controlling a Radio Frequency (RF) head end system and a plurality of TV sets in a limited space such as a hotel or hospital, and more particularly to a method for transmitting a signal to a TV set of a specific room from among a plurality of TV sets installed in respective rooms of a hotel or hospital using a multiple access point control system defined in the following description.

2. Discussion of the Related Art

Generally, a broadcast receiver receives a data stream including a broadcast signal, extracts a video and audio data stream corresponding to a user desired channel using service information contained in the received data stream, and outputs the extracted video and audio data stream to a display device.

However, according to the related art, detailed protocols or methods for more effectively transmitting and processing data to each room of a limited space such as a hotel or hospital are not defined yet.

SUMMARY OF THE INVENTION

An object of the present invention is to provide a method for providing a local messaging service to each room of a hotel using a digital television (DTV).

Another object of the present invention is to provide a method for providing a local messaging service to each room irrespective of physical communication environment of a hotel (e.g. coaxial connection or IP connection environment).

To achieve these objects and other advantages and in accordance with the purpose of the invention, as embodied and broadly described herein, a method is provided for controlling a digital television (DTV) located in one independent space among a plurality of independent spaces physically separated from one another, wherein the DTV is connected to a management server and includes an Access Point (AP) card, the method including receiving a message file from the management server, wherein the message file includes identification (ID) information of the independent space and primary additional information mapped to the independent space ID information, determining whether the independent space ID information is identical to ID information of a current independent space, displaying the primary additional information when the independent space ID information is identical to the current independent space ID information, transmitting both a request signal for requesting secondary additional information corresponding to the primary additional information a response signal including the independent space ID information to the management server, and displaying the secondary additional information received from the management server.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 14 shows a message file for implementing a local messaging service according to one embodiment of the present invention.

FIG. 15 shows a message file for implementing a local messaging file according to another embodiment of the present invention.

FIG. 16 FIG. 15 shows a message file for implementing a local messaging file according to yet another embodiment of the present invention.

DETAILED DESCRIPTION OF THE INVENTION

Figure 1:
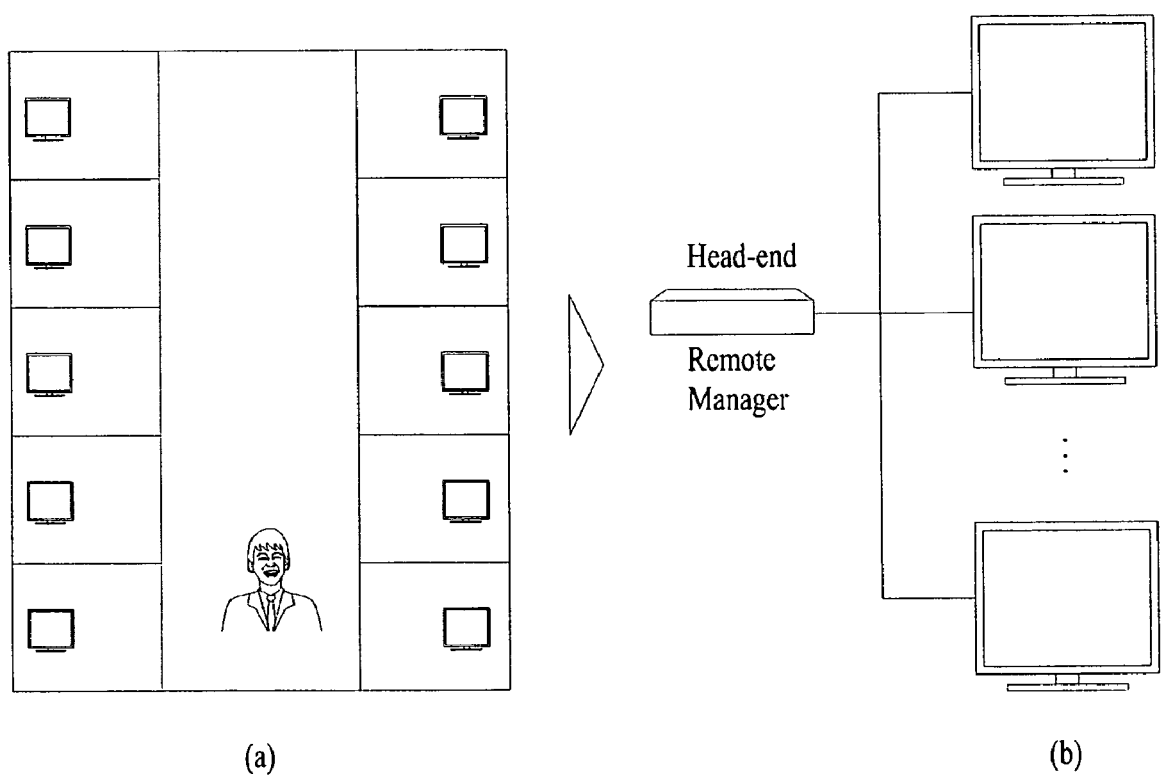
FIG. 1 is a diagram illustrating a multiple access point control system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, a system for controlling a multiple access point using a multiple access point control system is proposed. For example, the access point may be a part for providing information to each limited physical space, communicating with devices contained in the physical space, and controlling the devices. By means of the multiple access point control system, a specific access point may provide information to a user located in a corresponding physical space. In addition, the devices located in the physical space may communicate with a server located outside of the physical space through the access point.

In addition, the term 'physical space' is separated from a communication space, such as a cell, defined in a wireless field. The cell acting as the communication space is in the range that is affected by radio waves from a specific base station, such that a user equipment (UE) can communicate with a corresponding base station in the above-mentioned range. However, the access point may be a part for controlling and managing a specific physical space or local area (e.g., each room of a hotel or hospital). Although the devices contained in the physical space can communicate with an access point of another physical space, the devices communicate with the access point of the corresponding physical space, and as such a detailed example thereof will hereinafter be described.

The multiple access point control system may transfer the same information to a corresponding physical space through a multiple access point, or may transfer different information to individual physical spaces. The multiple access point control system may control the access point at a remote site such that information suitable for a user of a physical space including the access point can be independently provided. In accordance with one embodiment of the present invention, the server of the multiple access point control system includes a user interface capable of allowing a person who controls the server to easily control the multiple access point.

The access point may be arranged at a specific position of each physical space. In order to easily provide information to the user, the access point may be configured in the form of a card, such that it can be inserted into a television or a set-top box. In accordance with one embodiment of the present invention, the card-type access point designed to be inserted into a television or set-top box may also be abbreviated to an AP. In the case where the AP card is inserted into the television, the user can recognize information to be transmitted through the AP card by viewing the television.

Such a system may be located at a variety of places, for example, a hotel, a hospital, a school, a prison, etc. For convenience of description and better understanding of the present invention, it is assumed that the above-mentioned system is located at a hotel such that the multiple access point and a control system thereof are operated in the hotel. However, the scope and spirit of the present invention are not limited thereto, and the present invention is also applicable to other examples.

In the case of the hotel, a user lodges in the hotel, such that the user can view content such as broadcast content through a TV. If content provided to a user of a room through the TV is pay-per-view content, an accounting system connected to the TV can charge a usage fee to user-viewed content. However, a driving circuit associated with the accounting system is installed in each TV. If there is a need to upgrade a corresponding system, a hotel administrator who uses the related art must upgrade TV systems installed in all rooms, resulting in greater inconvenience of use.

In addition, since administrating all rooms is manually carried out by the hotel administrator, a large hotel having many rooms consumes an unnecessarily long period of time and great cost to manage such rooms.

With the increasing number of guests or lodgers who use wireless communication, there are many cases wherein a wireless communication network is installed in each floor of a hotel. However, there is a difficulty in providing enough bandwidth for all guests of respective floors to easily use the wireless communication network, such that it causes greater inconvenience to a guest or administrator of a hotel.

In the case of an old hotel, a hotel history may be considered to be a brand value of the hotel. In order to provide each room of the hotel with a control system, a communication system, and another system that allows individual services to be executed in all rooms, a large amount of costs are consumed. If the hotel architecture is changed to another to install the above-mentioned systems, the hotel prestige or value may be greatly deteriorated.

Therefore, according to the following embodiments of the present invention, if individual services are provided to users of rooms serving as different physical spaces, and an access point capable of entirely managing the rooms is installed in each room, the following embodiments can solve the above-mentioned problems by controlling only the access point of each room without great modification of a conventional hotel design. A multiple access point control system according to one embodiment of the present invention will hereinafter be described with reference to the annexed drawings.

FIG. 1 is a diagram illustrating a multiple access point control system according to one embodiment of the present invention. FIG. 1(a) shows a conventional hotel management system. FIG. 1(b) shows a multiple access point control system according to one embodiment of the present invention.

In accordance with the related art shown in FIG. 1(a), if a hotel administrator desires to upgrade a system applied to a TV of each room, the hotel administrator has to manually upgrade TVs of all rooms of the hotel. In other words, as shown in FIG. 1(a) illustrating the related art, if a device in any one room is wrongly operated or an empty room is brightly lit, the hotel administrator should directly visit each room so as to correct the incorrect operation of the device or switch off the light of the empty room.

The above-mentioned inconvenience will hereinafter be described in detail from the economic point of view.

Provided that a cost required for upgrading a TV driving circuit of each room once is denoted by 'a', the number of rooms is denoted by 'b', the number of software upgrade times every year is denoted by 'c', and a lifetime of a TV is denoted by 'd', a total cost 'a×b×c×d' is continuously consumed to maintain such a system.

FIG. 1(b) shows an exemplary case in which a multiple access point control system controls an access point of each room according to one embodiment of the present invention. It is assumed that the access point is configured in the form of a card such that the card-type access point is inserted into a TV. The hotel administrator controls an access point card of each room using a headend (server) connected to a TV of each room. The access point card can provide an individual service to a user of each room through a TV under the remote control of a headend. In addition, the access point card may communicate with a device of each room, or may control a variety of devices installed in each room.

Most hotels include an installation for a Video On Demand (VOD) accounting service for a TV. If an access point card is installed in the TV, each hotel can provide many more services to the user through the access point card. Therefore, a multiple access point control system can be easily installed in the hotel having many physical spaces, and can also be easily managed and maintained by the hotel administrator.

A variety of services can be provided to a user through the TV having the access point card. Exemplary services are as follows. If the user enters the room, a hotel logo is displayed on the TV, and a message including respective user names can be displayed on the TV.

In addition, the hotel notification or the hotel advertisement, etc. can be displayed on the TV, and travel or transportation information can be provided to the user. In addition, user desired information of respective rooms can be separately provided to individual rooms, and a detailed description thereof will hereinafter be described in detail.

Figure 2:
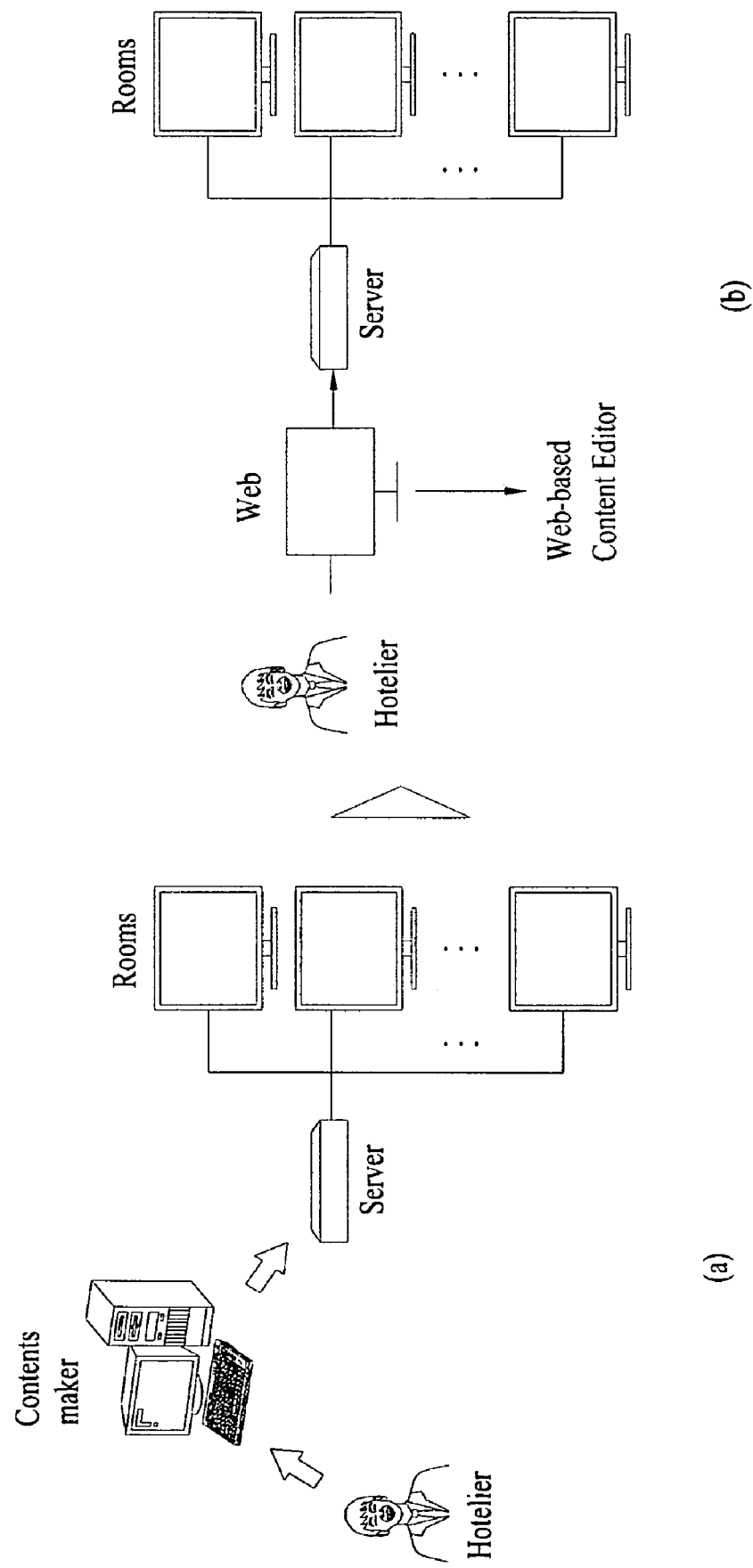
FIG. 2 is a diagram illustrating a multiple access point control system according to another embodiment of the present invention.

FIG. 2 is a diagram illustrating a multiple access point control system according to another embodiment of the present invention. FIG. 2(a) shows a system for allowing a hotel to charge an additional fee through a TV according to the related art. FIG. 2(b) is a diagram illustrating a multiple access point control system according to another embodiment of the present invention.

Referring to FIG. 2(a), the hotel administrator asks an external content provider or a system administrator either to manage a server for controlling TVs of respective rooms or to provide content. Accordingly, according to the related art, the content provider or the system administrator controls and manages not only content, that must be provided to the user through the TV, but also an accounting system for the content, and therefore, the TV of each room can provide a pay-per-view service to the user of each room.

According to the related art, if the hotel administrator changes a pay-per-view service to another service, the hotel administrator cannot directly control a detailed description required for the changed service. In the case of changing the system operation, the hotel administrator has difficulty in changing such a system operation under the condition that the hotel administrator sends the external content provider no request. In other words, it is next to impossible for the hotel administrator to change or manipulate services provided to each room independently from the system administrator.

Referring to FIG. 2(b), the server of the multiple access point system according to another embodiment of the present invention can allow the hotel administrator to directly provide content to a user of each room, and can also allow the hotel administrator to provide different information to the user. For example, the server for use in the multiple access point control system may have a Web-based editor. The user interface of the multiple access point control system can allow the hotel administrator to conveniently manage respective rooms, such that the hotel administrator can conveniently provide requirements of each room and an individual service that must be provided to each room.

The hotel administrator can edit services provided to each room using the user interface and the Web-based editor, such that individual or common services can be provided to respective rooms. If the hotel administrator edits the Web-based editor, the server of the multiple access point system can easily transmit an additional message to a user of a specific room, or can transmit specific content to the user. A detailed description thereof will hereinafter be described in detail.

Figure 3:
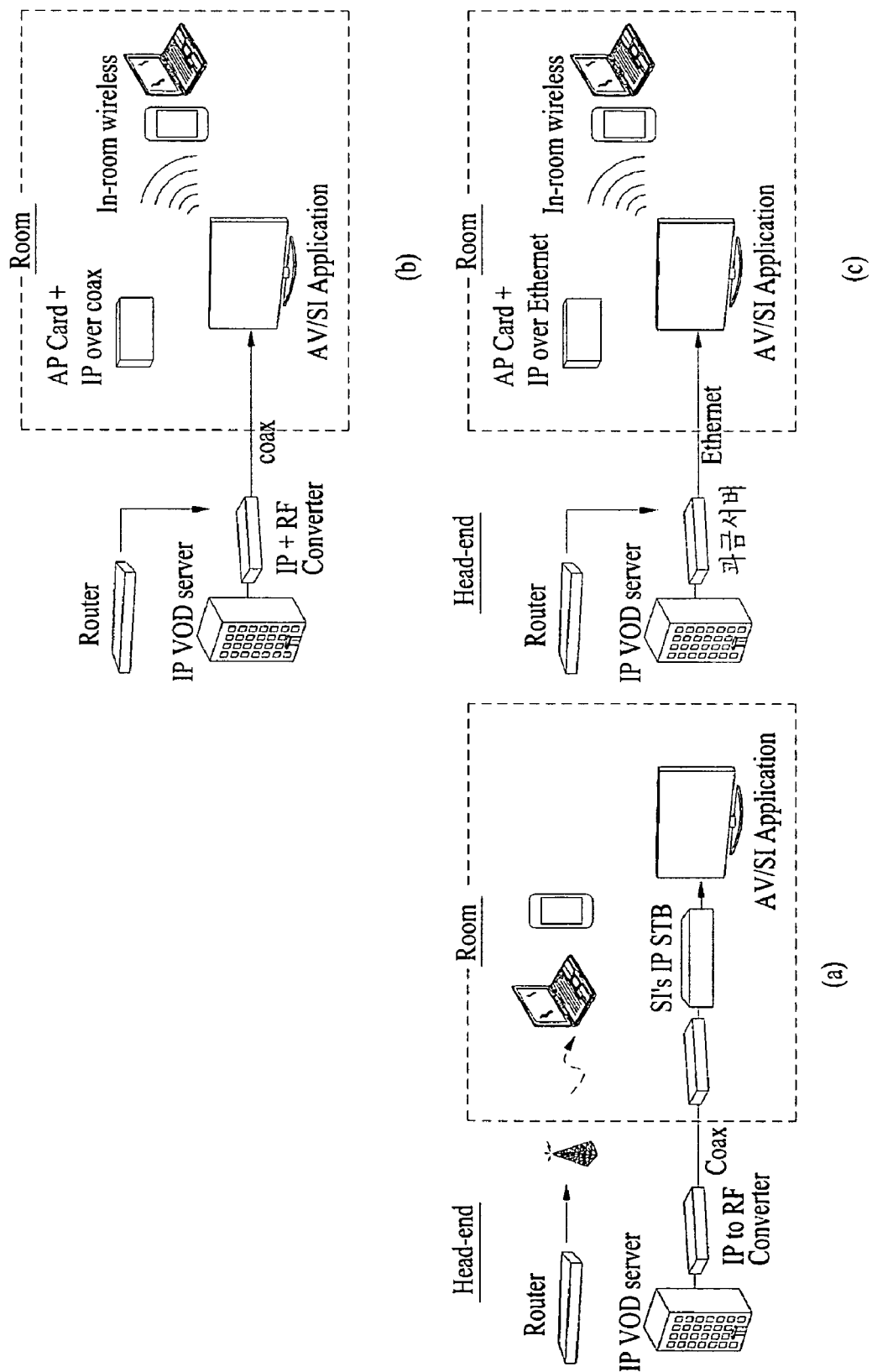
FIG. 3 is a diagram illustrating a multiple access point control system according to a yet another embodiment of the present invention.

FIG. 3 is a diagram illustrating a multiple access point control system according to yet another embodiment of the present invention. FIG. 3(a) illustrates a system capable of being applied to each room according to the related art. FIGS. 3(b) and 3(c) illustrate a multiple access point control system according to yet another embodiment of the present invention.

In the case of most hotels, a cable network is installed in each room as shown in FIG. 3(a). The cable network is connected to a set-top box of each room, or provides a VOD service to each room through a VOD server of the hotel.

For example, if the VOD server transmits an IP packet having video content, the IP-to-RF converter converts the IP packet into an RF signal, and transmits the RF signal to the cable network.

In addition, the set-top box or TV of each room receives the RF signal from the VOD server, and displays video content.

Referring to FIG. 3(a), if the user of each room desires to use the Internet or a wireless phone using a notebook computer based on wireless communication, it is necessary for each room to include a router connected to the Ethernet network or a wireless communication relay module. However, presently, most hotels include only a cable network and do not include a local area network (LAN) or a wireless communication network, such that high costs are needed to additionally install communication lines.

Recently, some hotels have installed one or two wireless communication relay models in each floor so as to provide a wireless communication service. However, the user of each room may not often acquire a service of a desired bandwidth. As a result, high costs are needed to install an additional wireless communication relay module in all rooms.

FIGS. 3(b) and 3(c) illustrate a service capable of being provided through a multiple access point control system according to yet another embodiment of the present invention. A cable network or an Ethernet network is installed in each room of the hotel, and the access point card is installed in a TV of each room. The server of the multiple access point control system is connected to the IP-to-RF converter and the router.

However, the embodiment of the present invention may be applied to one case in which the hotel environment includes the Coax network and another case in which the hotel environment includes the Ethernet network. If the hotel environment includes the Ethernet network, the hotel server additionally includes the accounting server to charge a usage fee on the VOD viewed by a user who lodges in the hotel.

In addition, from the viewpoint of a protocol layer, if the hotel environment includes the Coax network, Digital Storage Media Command and Control (DSM-CC) is converted into data based on an IP packet, and the IP-packet data is transferred using a cable modem protocol. On the other hand, if the hotel environment includes the Ethernet network, the DSM-CC is transferred as the IP packet.

In the meantime, the access point card may serve as a wireless communication module that transmits radio waves to a notebook computer or wireless phone of a user of each room. The notebook computer or wireless phone used by the user may communicate with an external server through the AP card, the cable network or the router.

The server of the multiple access point control system may provide video content or the like to the user of each room or provide a variety of services suitable for the user to the user of each room.

If the AP card is inserted into the television, the AP card may include middleware to drive a variety of applications provided to the user. In addition, the AP can support the multi-protocol interface, such that it may be used as an access point of the AP wireless communication or may control devices of respective rooms.

The IP-to-RF converter transmits the IP packet over a cable network, and the AP card includes the RF-to-IP converter such that it can provide an Internet-based communication service and a multimedia broadcast service to the user. The AP card includes general-purpose middleware standardized for the application provided to the user. Therefore, the service provided by the hotel administrator can be displayed on the TV regardless of TV functions. The AP card, that enables respective hotels to use different content protection functions so as to charge a usage fee for content, includes an operating system that enables various content protection modules to be implemented with software. Therefore, although respective hotels use different content protection functions, content can be transferred to the user through the same AP card, and a detailed description thereof will hereinafter be described in detail.

In the case of a hotel, a user may request a call service for a specific time from the hotel administrator. In the case of using the multiple access point control system, a reserved message may be transferred to the user through the television.

The AP card may communicate with other devices of each room, and drive the application supported by the multiple protocol interface, such that the user of the room may also control devices of the room through the TV.

The television including the AP card may provide a user interface for enabling the user to control devices of the room. For example, the television including the AP card may display various devices capable of being controlled in each room. The television may display a corresponding room and the positions of devices installed in the corresponding room.

For example, if the AP card communicates with the curtain control device, the user can freely open or close a curtain through the user interface displayed on the TV.

In addition, when adjusting an air-conditioner or a hygrometer, the user does not directly adjust a corresponding device, and can remotely operate the user interface displayed on the TV including the AP card.

Figure 4:
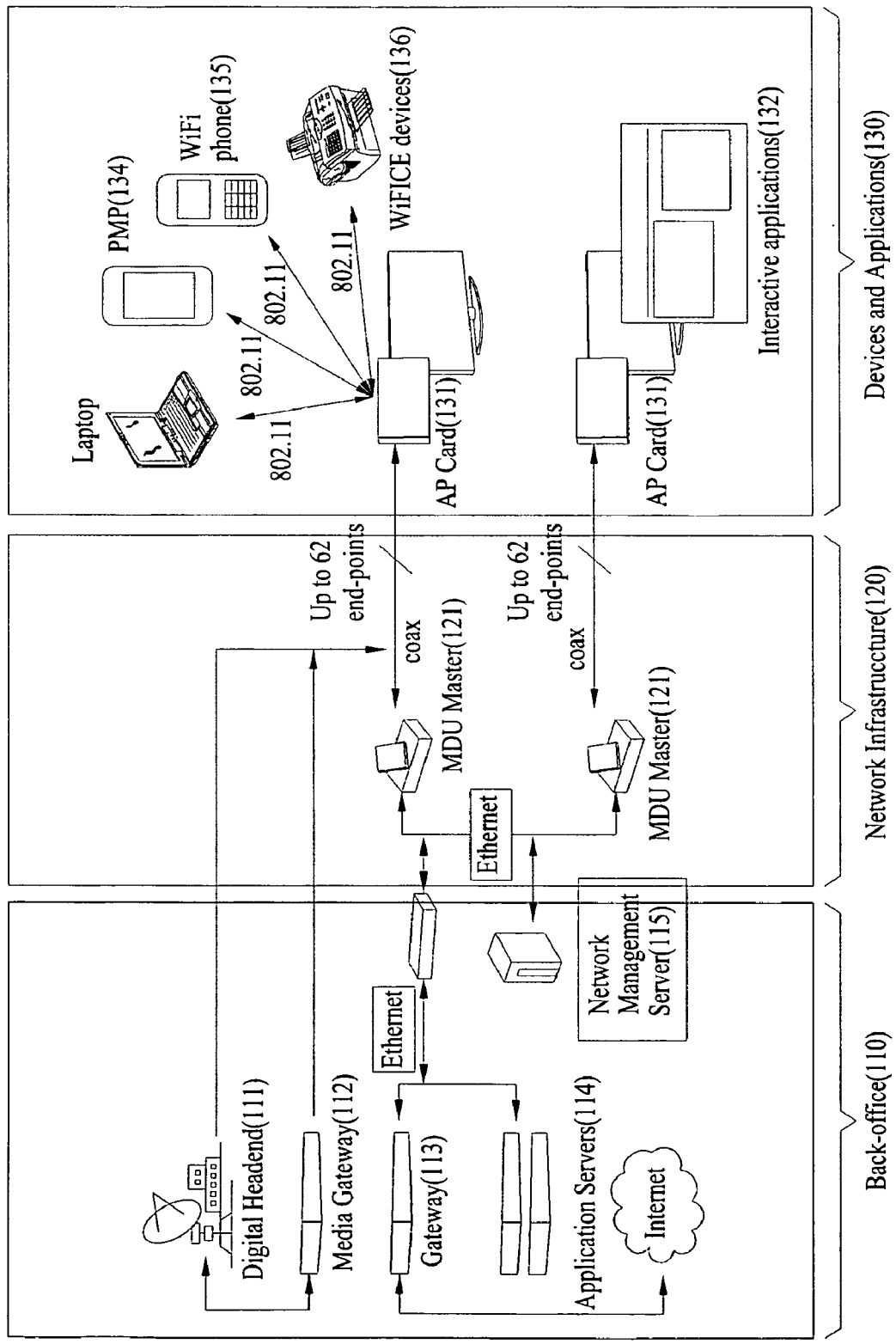
FIG. 4 is a diagram illustrating an access point and a multiple access point control system according to one embodiment of the present invention.

FIG. 4 is a diagram illustrating an access point and a multiple access point control system according to one embodiment of the present invention.

Referring to FIG. 4, the entire system according to one embodiment of the present invention includes a back-office 110, a network infrastructure 120, devices and applications 130, etc. The network management server 115 shown in FIG. 4 carries out functions of the multiple access point control system, and the AP card 131 carries out functions of the multiple access point.

For example, the back-office 110 includes a digital head-end 111, a media gateway 112, a gateway 113, application servers 114, a network management server 115, etc. The back-office 110 may be used to transmit broadcast data and IP data. For example, the back-office 110 may be a broadcast station or the like.

The network infrastructure 120 may include, for example, a Master Data Unit (MDU), etc. For example, the devices and applications 130 includes an Access Point (AP) card 131, interactive applications (for example, DTV) 132, a laptop 133, a Portable Multimedia Player (PMP) 134, a WiFi phone 135, WiFi CE devices 136, etc.

Specifically, the network management server 115 may be managed by the hotel or the service provider. The network management server 115 controls the MDU 121, such that it provides various data to the AP card 131 mounted to the DTV 132 of each room of the hotel.

The AP card 131 may transmit and receive data that is associated with VoIP, VOD, 2-way communication, personal area network, etc., and may process such data.

As shown in FIG. 4, the DTV 132 including the AP card 131 may share such data with peripheral devices (e.g., 133, 134, 135, 136, etc. of FIG. 4) of the DTV.

In addition, although it is assumed that the MDU 121 is connected to the AP card through a coaxial cable as shown in FIG. 4, the scope and spirit of the present invention are not limited thereto, and the embodiment of the present invention may also include another case wherein the network management server 115 is connected to the AP card 131 over the Ethernet.

Figure 5:
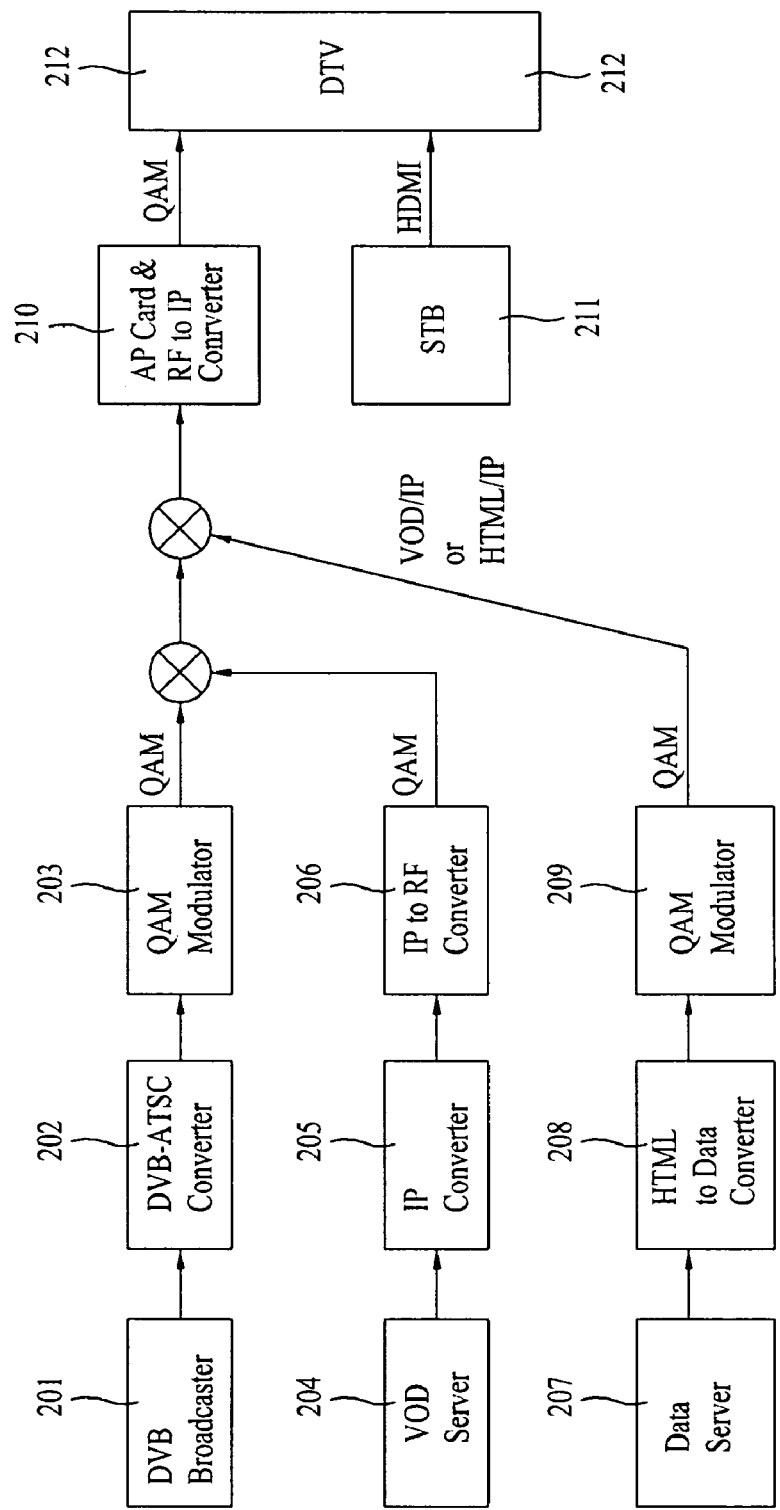
FIG. 5 is a diagram illustrating an access point and a multiple access point control system according to another embodiment of the present invention.

FIG. 5 is a diagram illustrating an access point and a multiple access point control system according to another embodiment of the present invention. FIG. 5 is a detailed block diagram of the entire system, differently from FIG. 4.

Referring to FIG. 5, the Digital Video Broadcasting (DVB) broadcaster 201 transmits a DVB signal, the DVB to ATSC Converter 202 converts the DVB signal into an ATSC signal, and the QAM modulator 203 modulates the converted ATSC signal into a QAM signal.

The VOD server 204 transmits a VOD signal, the IP converter 205 converts the VOD signal into the IP signal, and the IP to RF converter 206 converts the IP signal into the RF signal.

The Data Server 207 transmits an HTML signal, the HTML to Data converter 208 converts the HTML signal into data, and the QAM modulator 209 modulates the converted data into a QAM signal.

An AP CARD & RF to IP converter 210 receives the QAM signals from the QAM modulators 203 and 209 and the IP to RF converter 206.

The AP CARD & RF to IP converter 210 may directly transmit the QAM signal to the DTV 212. If necessary, the AP CARD & RF to IP converter 210 may convert the QAM signal into the IP signal, and transmit the IP signal to the set-top box (STB) 211.

In addition, the DTV 212 may process the QAM signal received from the AP CARD & RF to IP converter 210, and the processed signal may be displayed according to various display schemes, for example, LCD, PDP, ELD, VFD, etc.

The STB 211 may be connected to the DTV through a cable, for example, an HDMI, DVI, or D-sub cable.

The STB 211 may be connected to the DTV 212 over a wireless network, such as Zigbee, Bluetooth, or Wlan, etc.

Meanwhile, the DVB broadcaster 201, the VOD server 204, and the Data Server 207 may be managed by a broadcast station, a Content Provider (CP), a Service Provider (SP), etc. For example, the DVB to ATSC Converter 202, the IP Converter 205, the HTML to Data Converter 208, the QAM Modulator 203, the IP to RF Converter 206, and the QAM Modulator 209 may be managed by a hotel, a hospital, etc. For example, the AP card & RF to IP Converter 210, the STB 211, or the DTV 212 may represent a digital broadcast receiver.

Therefore, in the case of using the system shown in FIG. 5, a hotel not providing Internet services can easily provide Internet services (e.g., Internet services received from the VOD server or the Data Server) to guests of each room of the hotel.

Figure 6:
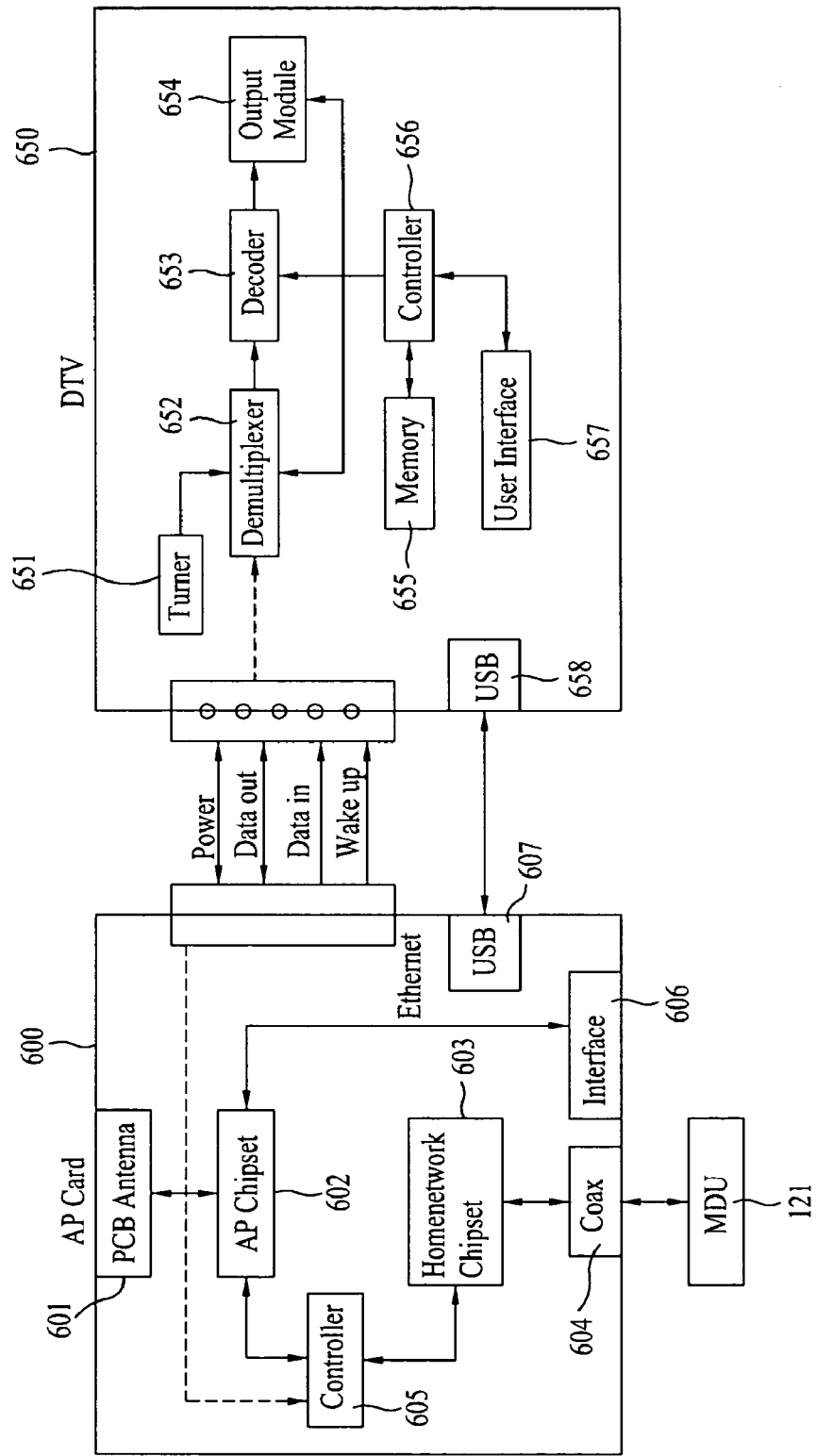
FIG. 6 is a block diagram illustrating an AP card and a DTV according to one embodiment of the present invention.

FIG. 6 is a block diagram illustrating an AP card and a DTV according to one embodiment of the present invention. FIG. 6 illustrates an exemplary case in which there is no DTV Ethernet in each room of the hotel. For example, the AP card shown in FIG. 6 may serve as the above-mentioned multiple access point.

Referring to FIG. 6, the AP card 600 includes a variety of modules, for example, a PCB antenna 601, an AP chipset 602, a homenetwork chipset 603, a Coax module 604, an interface 606, a controller 605, a USB 607, etc. As shown in FIG. 6, the DTV 650 includes a variety of modules, for example, a controller 656, a tuner 651, a demultiplexer 652, a decoder 653, an output module 654, a memory 655, a user interface 657, a USB 658, etc. However, for better understanding of the present invention, the MDU 121 shown in FIG. 6 may also correspond to the MDU shown in FIG. 4 as necessary.

The AP card 600 may be connected to the MDU 121 through the coax line. The controller 605 may copy packets between the AP chipset 602 and the homenetwork chipset 603. Further, the controller 605 controls the AP chipset 602 and the homenetwork chipset 603. For example, the homenetwork chipset 603 may be a Multimedia over Coax Alliance (MoCA) chipset or a Home Phoneline Networking Alliance (HPNA) chipset, etc.

The AP chipset 602 may control communication with a plurality of devices contained in each room including the DTV 650. In more detail, the AP chipset 602 may provide a wireless Internet service such as WiFi to the devices.

The homenetwork chipset 603 may convert the RF signal into IP data through a cable network (coax) 604. If it is necessary to transmit the IP data to a wireless communication device of each room, the homenetwork chipset 603 may transmit the IP data to the AP chipset 602. The homenetwork chipset 603 may convert the IP data received from the AP chipset 602 into an RF signal, and transmit the RF signal to the coax module 604. The PCB antenna 601 may be a module that enables several devices of each room including the DTV 650 to wirelessly communicate with the AP chipset 602.

In the meantime, the tuner 650 receives the RF broadcast signal. The USB 607 of the AP card 600 may transmit and receive data to and from the USB 658 of the DTV 650, for example, large amounts of data for firmware or data for setting a Service Set Identifier (SSID) may be communicated between the USB 607 and the other USB 658.

The AP card 600 transmits and receives a VoIP signal through, for example, the AP chipset 602, transmits a VOD signal to the DTV 650 through the USB 607, and provides information (e.g., GEM application data, etc.) associated with data broadcast content of the hotel through the USB 607. The controller 656 of the DTV 650 controls a tuner 651, a demultiplexer 652, a memory 655, a user interface 657, etc. The demultiplexer 652 may demultiplex a video signal, an audio signal, and data received from either the AP card 600 or the tuner 651.

The decoder 653 may decode the demultiplexed video and audios signals and the demultiplexed data. The output module 654 may output the decoded video and audio signals and the decoded data.

Further, the memory 655 may store some or all information received from the AP card 600. The user interface 657 may transmit a user-entry command signal to the controller 656.

Figure 7:
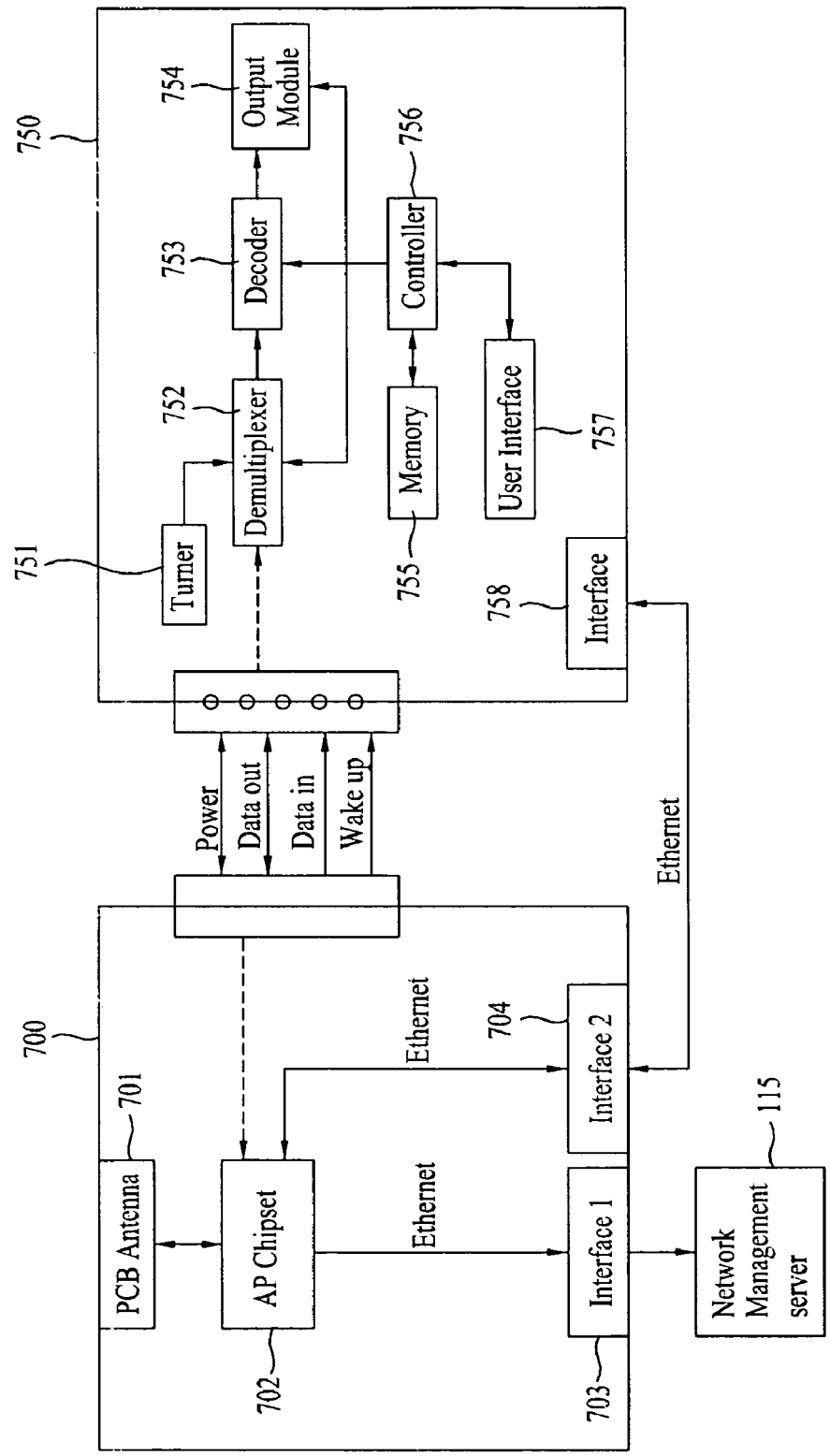
FIG. 7 is a block diagram illustrating an AP card and a DTV according to another embodiment of the present invention.

FIG. 7 is a block diagram illustrating an AP card and a DTV according to another embodiment of the present invention. FIG. 7 illustrates an exemplary case that the DTV contained in each room of the hotel includes the Ethernet connection. The main concept of FIG. 7 may also be understood by referring to FIG. 6 as necessary. For example, the AP card shown in FIG. 7 may serve as the access point.

Referring to FIG. 7, the AP card 700 includes a plurality of modules, for example, a PCB antenna 701, an AP chipset 702, a first interface (Interface 1) 703, a second interface (Interface 2) 704, etc. For example, the DTV 750 includes a plurality of modules, for example, a controller 756, a tuner 751, a demultiplexer 752, a decoder 753, an output module 754, a memory 755, a user interface 757, an interface 758, etc. However, for better understanding of the present invention, the network management server 115 shown in FIG. 7 may also correspond to the network management server shown in FIG. 4.

Differently from FIG. 6, the AP card 700 shown in FIG. 7 receives the Ethernet signal from the network management server 115, and the AP chipset 702 may communicate with several devices contained in each room having the DTV 750.

In more detail, the AP chipset 702 may provide an Internet service such as WiFi to several devices. The PCB antenna 701 may be a module that enables several devices of each room including the DTV 650 to wirelessly communicate with the AP chipset 602.

Further, the first interface (Interface 1) 703 is a module for transmitting and receiving an Ethernet signal to and from the network management server 115. The second interface (Interface 2) 704 is a module for transmitting and receiving an Ethernet signal to and from the interface 758 contained in the DTV 750.

In addition, the controller 756 of the DTV 750 controls a demultiplexer 752, a decoder 753, an output module 754, a memory 755, a user interface 757, etc. The demultiplexer 752 may demultiplex a video signal, an audio signal, and data received from the AP card 700.

The decoder 753 may decode the demultiplexed video and audios signals and the demultiplexed data. The output module 754 may output the decoded video and audio signals and the decoded data.

Further, the memory 755 may store some or all information received from the AP card 700. The user interface 757 may transmit a user-entry command signal to the controller 756.

Figure 8:
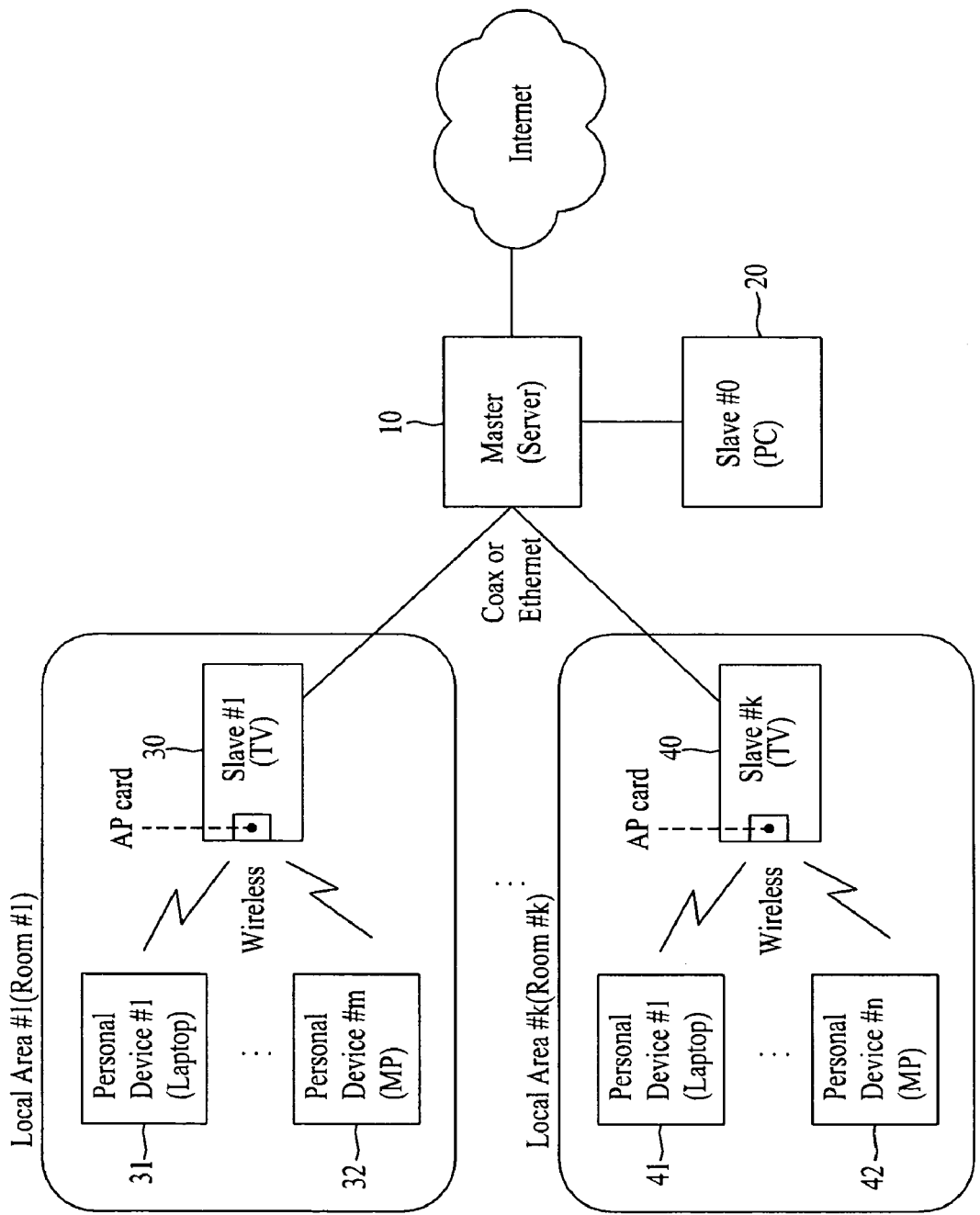
FIG. 8 is a block diagram illustrating a system for providing an Internet service to each room of a hotel according to one embodiment of the present invention.

FIG. 8 is a block diagram illustrating a system for providing an Internet service to each room of a hotel according to one embodiment of the present invention.

Referring to FIG. 8, the master 10 may perform a function of the above-mentioned multiple access point control system. The AP card may perform, for example, a function of the multiple access point.

First of all, the embodiment of the present invention discloses a system for providing an Internet service installed in a specific place such as a hotel having one or more rooms. Referring to FIG. 8, the above-mentioned system includes the master connected to the Internet, local slaves 30 and 40, and a management slave 20. The master 10 is connected to the Internet. The local slaves 30 and 40 are connected to the master 10 by wire, and are wirelessly connected to personal devices 31, 32, 41, and 42 of specific local areas #1 to #K. The management slave 20 may be connected to the local slaves 30 and 40 through the master 10.

In the meantime, the master 10 may be, for example, a hotel server or a headend. The management slave 20 is, for example, a personal computer (PC) installed in a hotel reception area or front desk. The local slave 30 or 40 may be, for example, a TV installed in each hotel room.

In addition, as can be seen from FIG. 8, the local slaves 30 and 40 may include a wired/wireless communication unit for communicating with the PCs 31, 32, 41, and 42 (e.g., a laptop computer and a mobile phone) used by the user who is located at a corresponding local area, and may further include another wired/wireless communication unit for communicating with the master 10.

For example, the wireless communication unit may be a WiFi PAN access point module. For example, the wired communication unit may be a MoCA/HPNA module. Meanwhile, the WiFi PAN access point module is manufactured in the form of a wireless communication chip that can perform wireless communication through the Personal Area Network (PAN) according to the WiFi technology for supporting various wireless network standards (e.g., 802.11, 802.11a, 802.11b, and 802.11g protocols).

In addition, the MoCA/HPNA module is manufactured in the form of a chip using a telephone line, a power line, or a coaxial cable (Coax). In this case, the Multimedia over Coax Alliance (MoCA) technology and the Home Phoneline Networking Alliance (HPNA) technology may be applied to the manufactured chip, such that the chip can communicate with the master 10 by wire.

Figure 9:
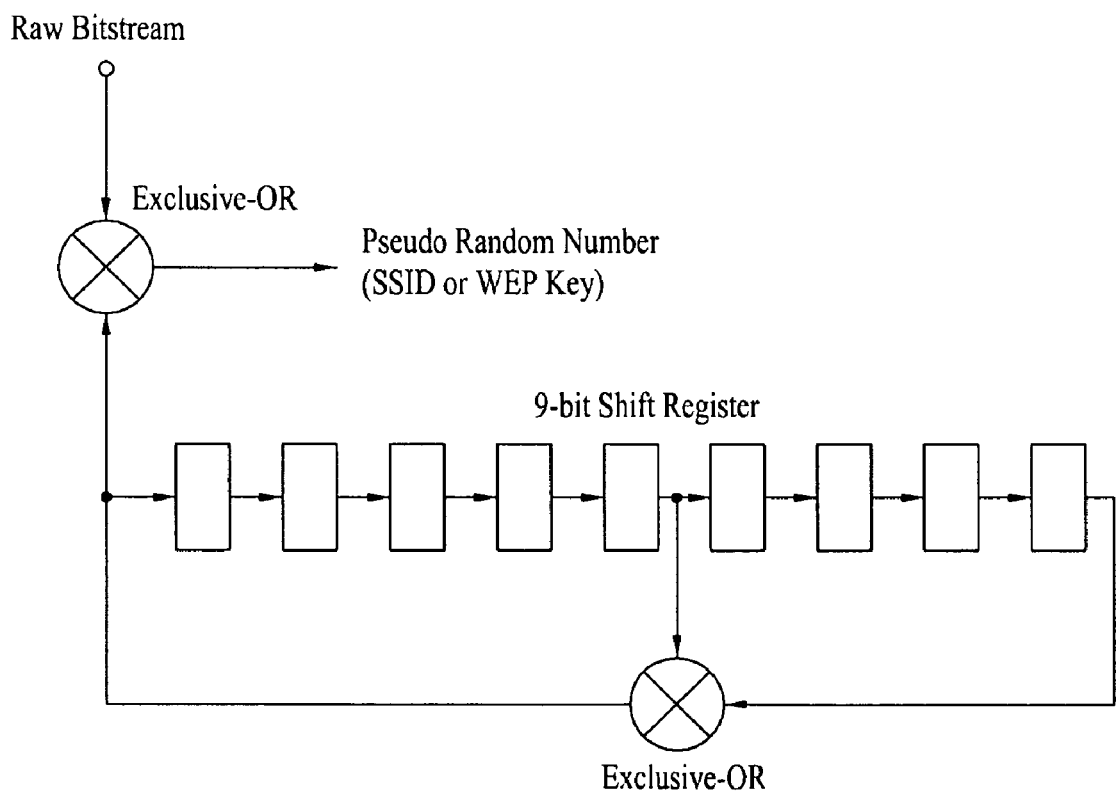
FIG. 9 is a diagram illustrating a procedure for generating a unique SSID and WEB key value according to one embodiment of the present invention.

FIG. 9 is a diagram illustrating a procedure for generating a unique SSID and WEB key value according to one embodiment of the present invention.

Referring to FIG. 9, the management slave 20 or the local slaves 30 and 40 shown in FIG. 8 generate Pseudo Random Numbers indicating a unique Service Set Identifier (SSID) and a Wired Equivalent Privacy (WEP) key using two Exclusive-OR gates and a 9-bit shift register.

For example, the SSID is a unique ID N bytes long (e.g., unique ID 32 bytes long) added to each header of packets transmitted over a wireless LAN, and is used like a code or password when connected to wireless terminals. The SSID may discriminate one wireless LAN from other wireless LANs. Therefore, according to one embodiment of the present invention, all access points or wireless terminals, that desire to access a specific wireless LAN, are designed to use the same unique SSID.

The WEP encrypts data, that is communicated between an adaptor and an access point connected to the wireless LAN, into 64 bits (40+24) or 128 bits (104+24), resulting in increased security. According to one embodiment of the present invention, the WEP key value is used as an encryption key value, and the same WEP key value is assigned to a plurality of communication terminals.

In the meantime, the SSID is configured in the form of a predetermined unique value that is a combination of a unique number (e.g., a hotel room number 501) assigned to a specific local area and a name (e.g., KIM) of a user who uses the specific local area. The WEP key is configured in the form of a predetermined unique value that is a combination of a name (e.g., KIM) of a user who uses the specific local area and a card number (e.g., 4518-XXXX-XXXX-XXXX).

The local slave 30 transmits the SSID to personal devices 31 and 32 contained in the corresponding local area (LOCAL AREA #1), and displays the WEP key value on the screen. The user may establish the SSID and the key value in each personal device. Therefore, the personal device in which the SSID and the WEP key value are established may receive Internet service through the local slave and the master, and a detailed description thereof will hereinafter be described with reference to FIGS. 10 to 12.

Figure 10:
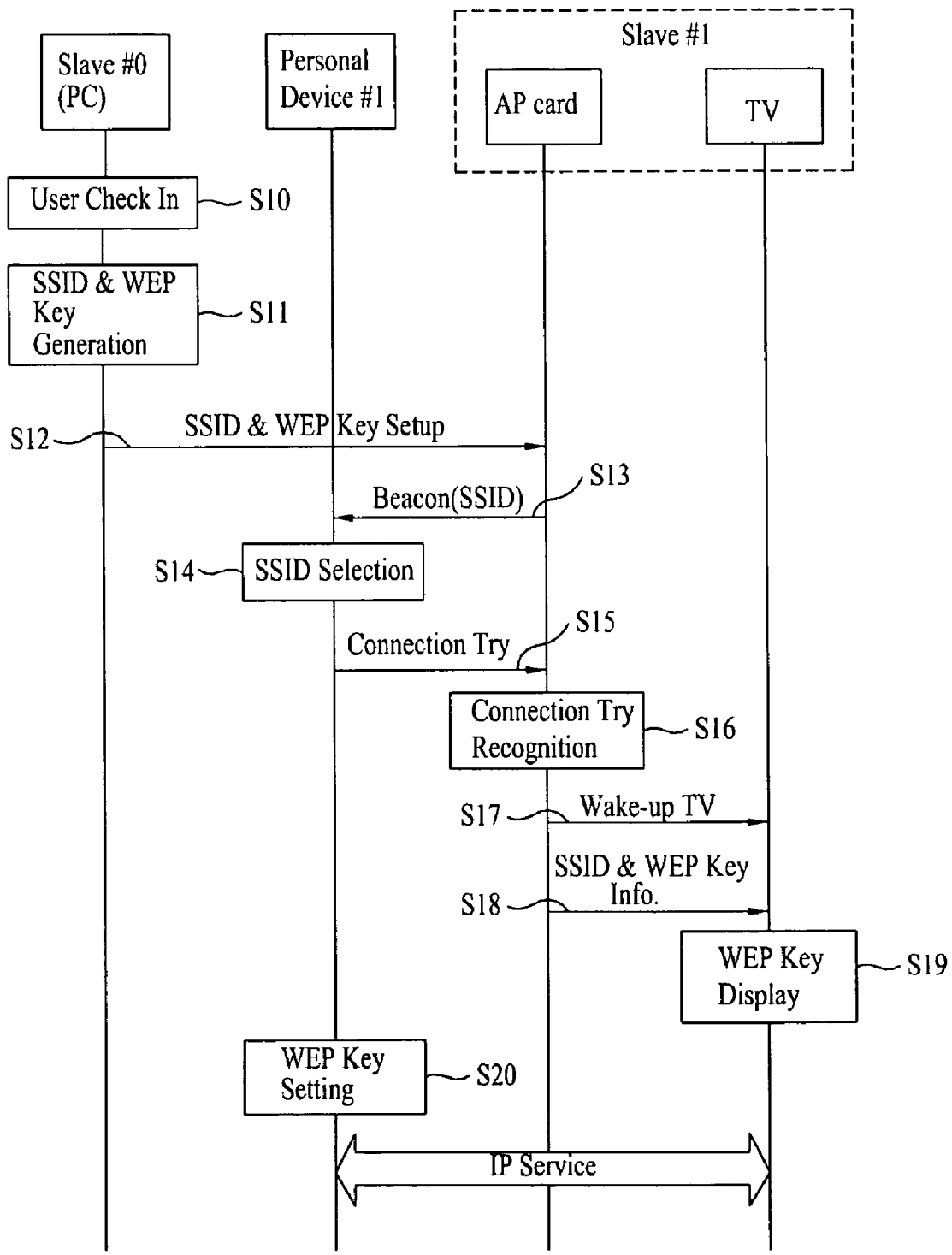
FIG. 10 is a flowchart illustrating a method for providing an Internet service according to a first embodiment of the present invention.

FIG. 10 is a flowchart illustrating a method for providing an Internet service according to a first embodiment of the present invention.

Referring to FIG. 10, if a user who desires to lodge in a hotel checks in to the hotel at step S10, a management slave (Slave #0) indicating a personal computer (PC) located at the front desk of the hotel combines a unique number of a hotel room in which the user will stay with name of the user, and generates a unique SSID and a WEP key value at step S11.

The Slave #0 establishes the SSID and the WEP key value in a local slave (Slave #1) connected to the Salve #0 through the master 10 at step S12. For example, the Slave #1 transmits the SSID to the Personal Device #1 using a beacon signal at step S13.

If the personal device #1 selects the SSID at step S14, the user may attempt to access the Internet service. In this case, the personal device #1 transmits a connection try command signal to the AP card at step S15. If the AP card recognizes an Internet service access attempt signal on the basis of the connection try command signal at step S16, the AP card wakes the DTV contained in the Slave #1 at step S17.

The AP card may transmit the SSID and the WEP key value to the DTV at step S18, and the DTV may display the WEP key value on the screen at step S19. The user enters the displayed WEP key value in the personal device #1 so as to perform a series of WEP key setup operations at step S20. Thereafter, the user requests the Internet service, such that the personal device #1 can receive the Internet service and the like through the local slave (Slave #1) and the master using the established Internet SSID and WEP key value.

Figure 11:
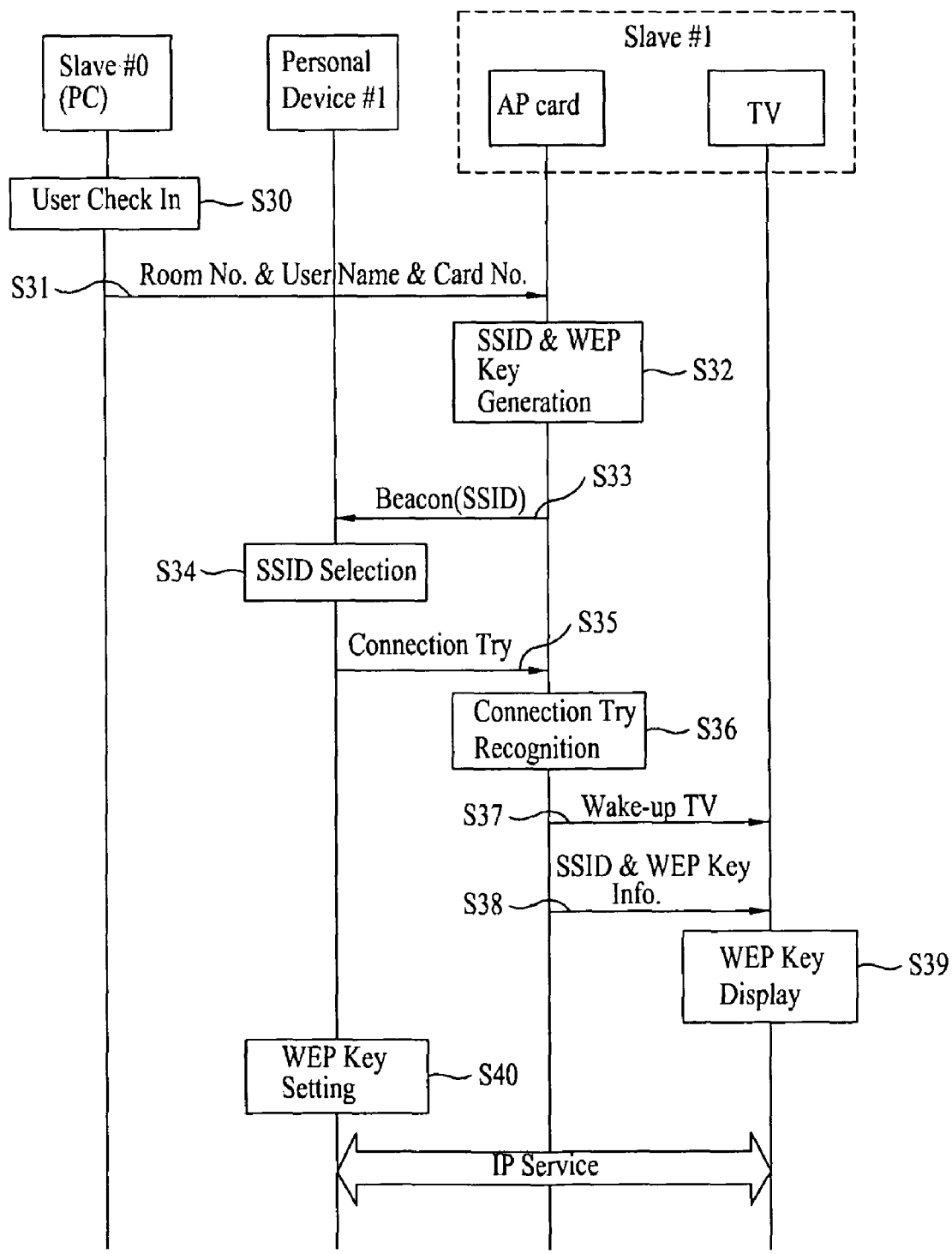
FIG. 11 is a flowchart illustrating a method for providing an Internet service according to a second embodiment of the present invention.

FIG. 11 is a flowchart illustrating a method for providing an Internet service according to a second embodiment of the present invention.

For example, if a user who desires to lodge in a hotel checks in to the hotel at step S30, a management slave (Slave #0) indicating a personal computer (PC) located at the front desk of the hotel may transmit a unique number of a hotel room in which the user will stay, the user's name, the user's resident registration number, or the card number to the AP card of the Slave #1 connected to the Slave #0 through the master 10 at step S31.

In the meantime, the AP card combines the unique number of the hotel room and the user's name, such that it generates a predetermined unique SSID using the combined result. The AP card combines the user's resident registration number and/or the card number, such that it generates a predetermined unique WEP key value at step S32.

The AP card may wirelessly transmit the SSID to the personal device #1 using a beacon signal at step S33.

If the personal device #1 selects the SSID at step S34, the user may attempt to access the Internet service. In this case, the personal device transmits a connection try command signal to the AP card at step S35. If the AP card recognizes an Internet service access attempt signal on the basis of the connection try command signal at step S36, the AP card wakes the DTV contained in the Slave #1 at step S37.

The AP card may transmit the SSID and the WEP key value to the DTV at step S38, and the DTV may display the WEP key value on the screen at step S39.

The user enters the displayed WEP key value in the personal device #1 so as to perform a series of WEP key setup operations at step S40. Thereafter, the user requests the Internet service, such that the personal device #1 can receive the Internet service through the local slave (Slave #1) and the master using the established Internet SSID and WEP key value.

Figure 12:
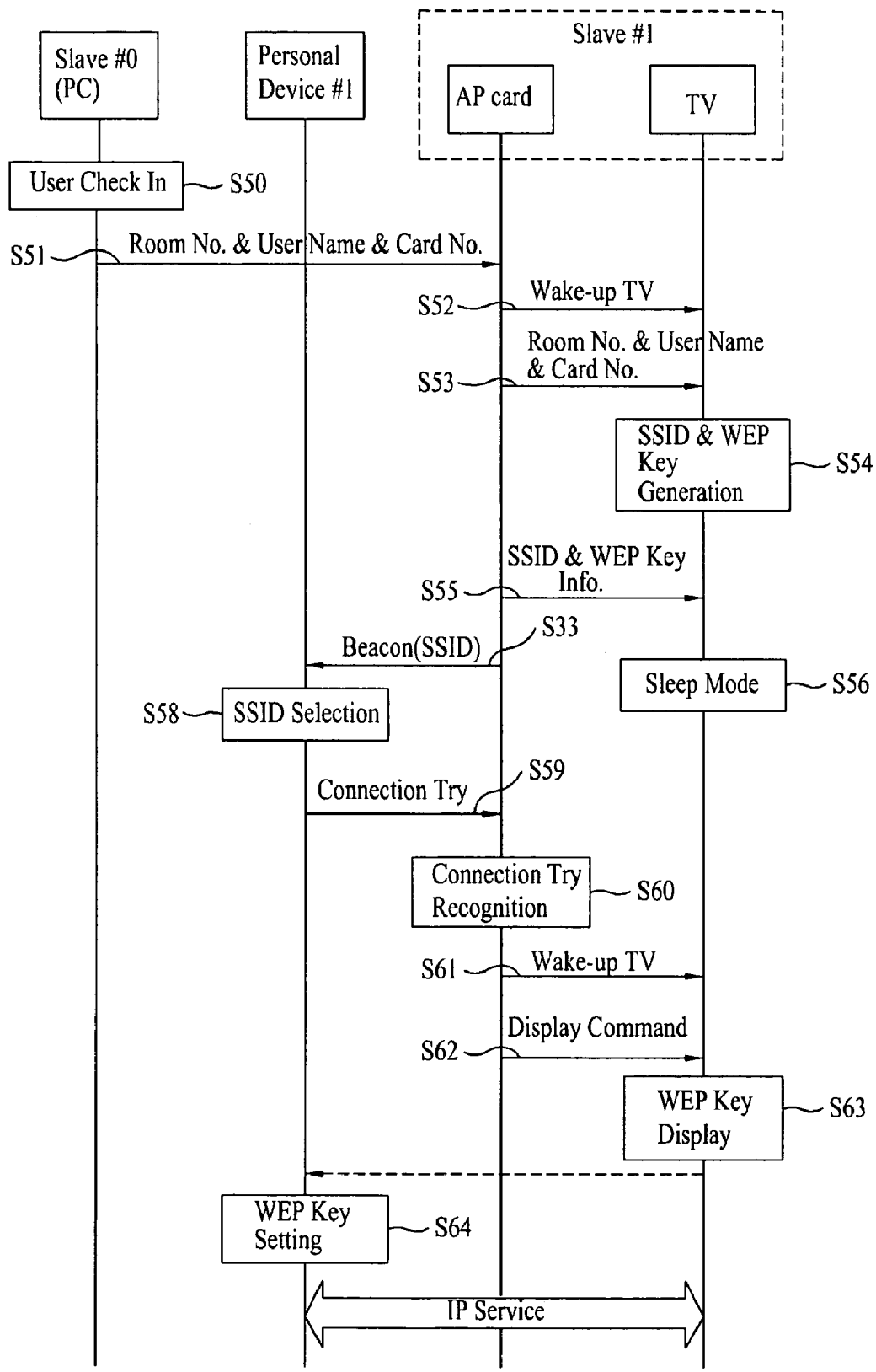
FIG. 12 is a flowchart illustrating a method for providing an Internet service according to a third embodiment of the present invention.

FIG. 12 is a flowchart illustrating a method for providing an Internet service according to a third embodiment of the present invention.

For example, if a user who desires to lodge in a hotel checks in to the hotel at step S50, a management slave (Slave #0) indicating a PC located at the front desk of the hotel may transmit a unique number of a hotel room in which the user will stay, the user's name, the user's resident registration number, or the card number to the AP card of the Slave #1 being connected to the Slave #0 through the master 10 at step S51.

The AP card may wake the DTV of the local slave (Slave #1) at step S52, and transmit a unique number of the hotel room, a user name, and a user's resident registration number or a card number to the DTV at step S53.

The DTV combines the unique number of the hotel room and the user's name such that it generates a predetermined unique SSID. In addition, the DTV combines the user's name, the user's resident registration number, and/or the card number, such that it generates a predetermined unique WEP key value at step S54.

The DTV transmits the SSID and the WEP key value to the AP card at step S55. The DTV automatically enters a power saving mode, i.e., a sleep mode at step S56. The AP card wirelessly transmits the SSID to the personal device #1 using a beacon signal at step S57.

If the personal device #1 selects the SSID at step S58, the user may attempt to access the Internet service. In this case, the personal device #1 transmits a connection try command signal to the AP card at step S59. If the AP card recognizes an Internet service access attempt signal on the basis of the connection try command signal at step S60, the AP card wakes the DTV contained in the Slave #1 at step S61.

The AP card may transmit a command signal that asks the DTV to display the WEP key value to the DTV at step S62, and the DTV may display the WEP key value on the screen at step S63.

The user enters the displayed WEP key value in the personal device #1 so as to perform a series of WEP key setup operations at step S64. Thereafter, the user requests the Internet service, such that the personal device #1 can receive the Internet service and the like through the local slave (Slave #1) and the master using the established Internet SSID and WEP key value.

Figure 13:
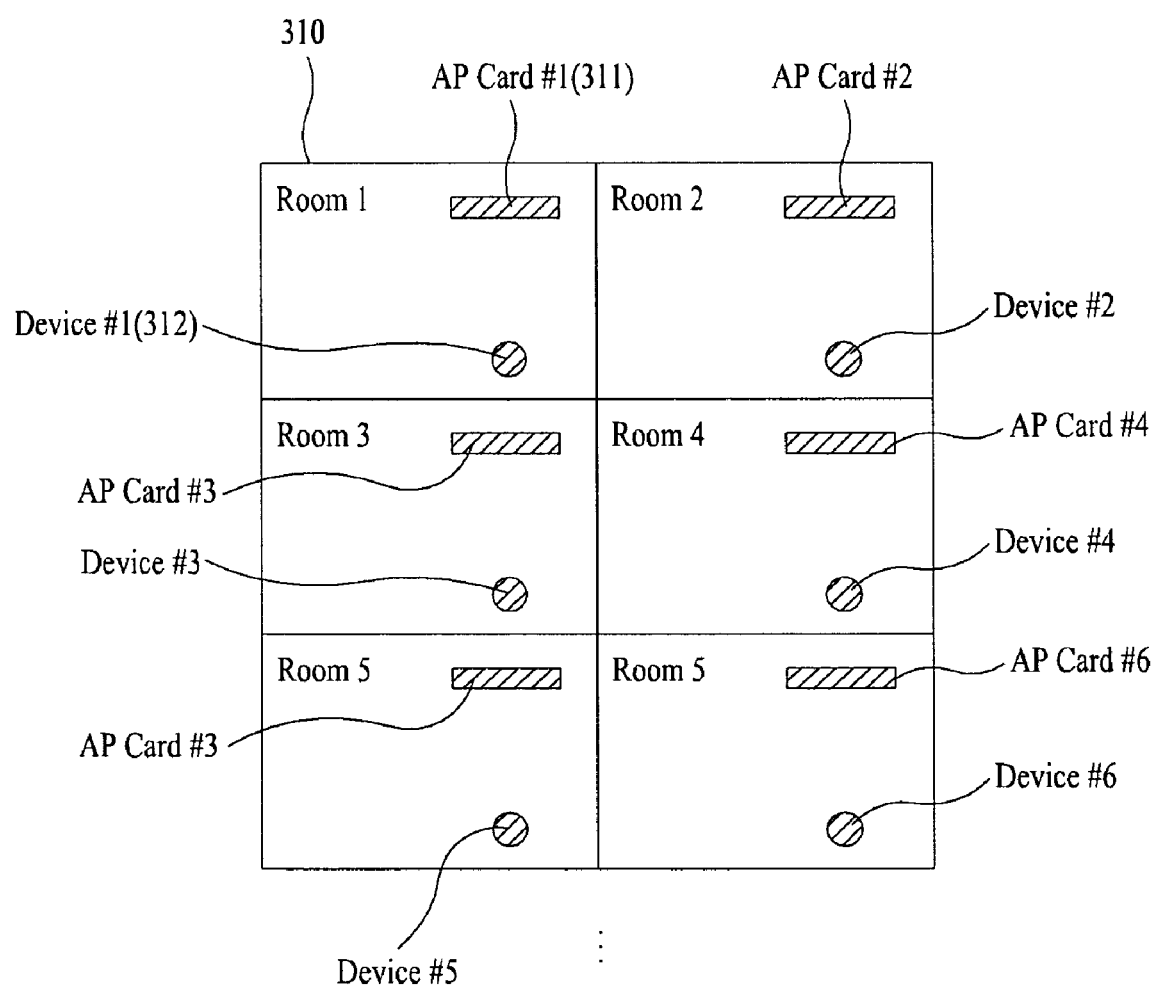
FIG. 13 shows an installation example of AP cards and devices that are located in respective rooms of a limited space such as a hotel or hospital according to one embodiment of the present invention.

FIG. 13 shows an installation example of AP cards and devices that are located in respective rooms of a limited space such as a hotel or hospital according to one embodiment of the present invention.

Referring to FIG. 13, the AP card 311 may be independently located, or may be mounted to the DTV of each room 310.

In the case of using the above-mentioned embodiment, although a first device (Device #1) of a Room 1 is close to an AP Card #3 of a Room 3, it communicates with an AP Card #1 of the Room 1. Similarly, although a second device (Device #2) of a Room 2 is close to the AP Card #4 of the Room 4, it communicates with the AP Card #2 of the Room 2. Therefore, respective AP cards may not communicate with devices of other rooms whereas they communicate with devices of a corresponding physical space. That is, according to one embodiment of the present invention, the user of each room may sufficiently receive a communication service of a given bandwidth, irrespective of an amount of data used for communication with a user of another room.

Further, the network management server may transmit the same or another control signal to AP cards of individual rooms shown in FIG. 13. As a result, the DTV to which the AP card of each room is mounted can display a room interactive service including a variety of services capable of being provided in the hotel, for example, room service, hotel information, a reservation service, a check-out information service, an entertainment service, a game service, etc.

Different room interactive services may be provided to individual rooms. Otherwise, only some rooms of the hotel may receive different room interactive services, or all the rooms of the hotel may receive the same room interactive services.

In the meantime, the device 312 located at each room 310 of the hotel may receive data of a VoIP service, data of a VOD service, or data of an Internet service.

FIG. 14 shows a message file for implementing a local messaging service according to one embodiment of the present invention.

FIG. 15 shows a message file for implementing a local messaging file according to another embodiment of the present invention.

FIG. 16 FIG. 15 shows a message file for implementing a local messaging file according to yet another embodiment of the present invention.

Figure 17:
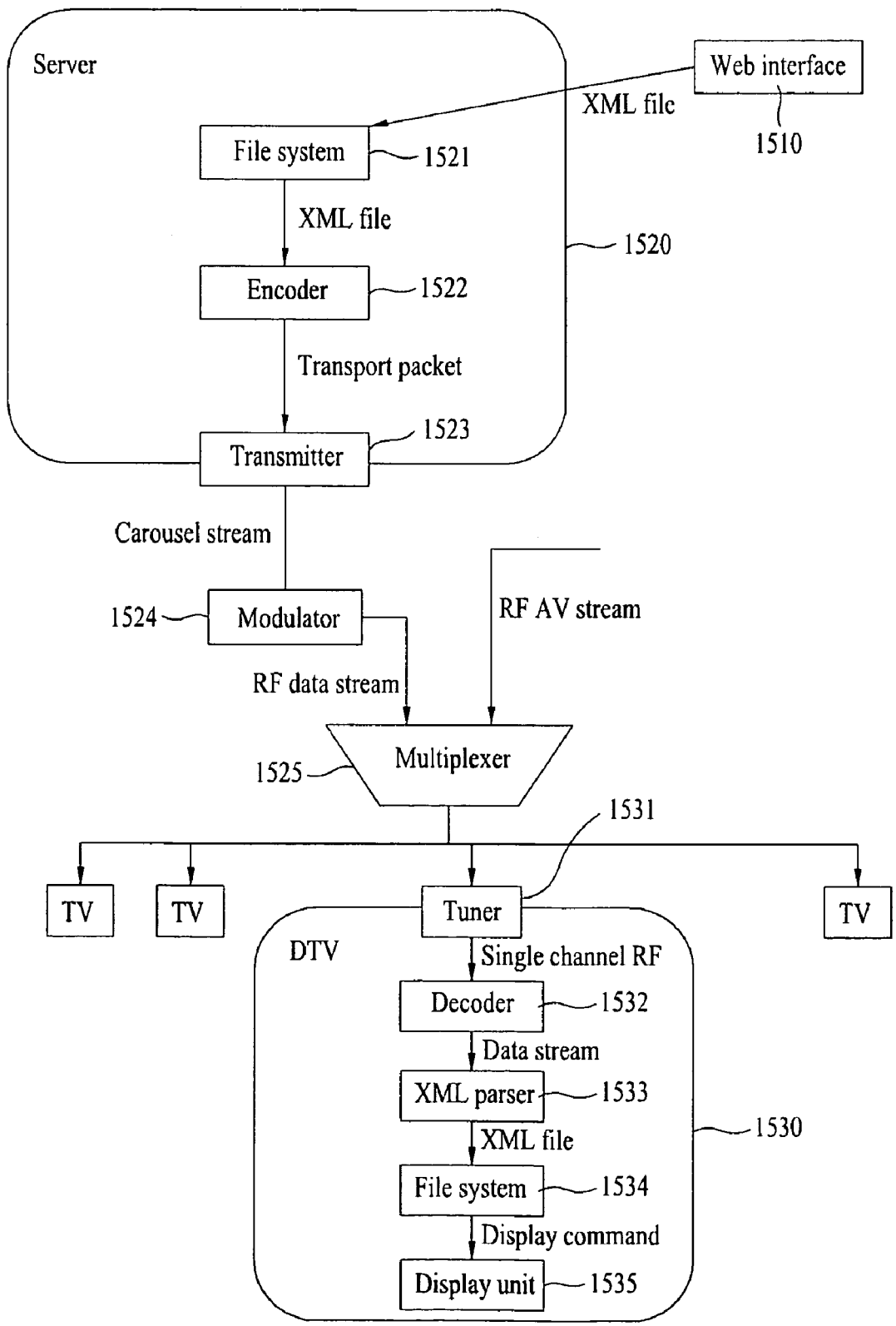
FIG. 17 is a block diagram illustrating a management server and a DTV for implementing a local messaging service at a hotel having a coaxial communication environment according to one embodiment of the present invention.

FIG. 17 is a block diagram illustrating a management server and a DTV for implementing a local messaging service at a hotel having a coaxial communication environment according to one embodiment of the present invention.

Figure 18:
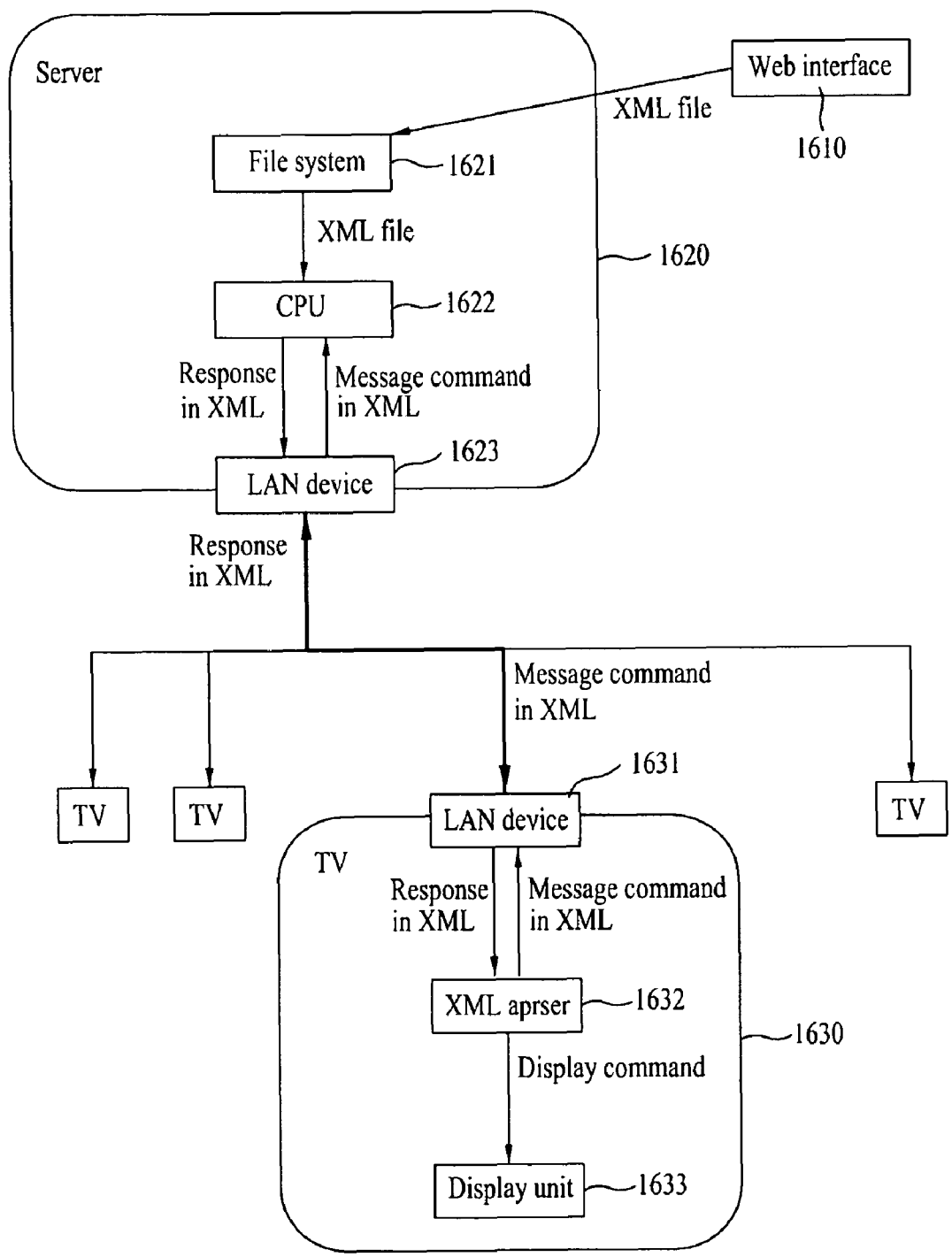
FIG. 18 is a block diagram illustrating a management server and a DTV for implementing a local messaging service at a hotel having an IP communication environment according to one embodiment of the present invention.

FIG. 18 is a block diagram illustrating a management server and a DTV for implementing a local messaging service at a hotel having an IP communication environment according to one embodiment of the present invention.

In accordance with the related art, the American Public Broadcasting System carries a message to be transmitted to all areas through a general MPEG-2 stream. In addition, according to Open Cable Standard, if an emergency alert message is transmitted through Out Of Band (OOB), the emergency alert is compulsorily tuned to a specific channel. However, the above-mentioned methods can be controlled only by a broadcast station, and are unable to provide different message services to individual rooms of a hotel or the like. One embodiment of the present invention provides a method for solving the problems of the related art. Specifically, a management server and a DTV under the coaxial communication environment and the IP communication environment according to the embodiment of the present invention will hereinafter be described in detail. For example, the management server may be a server that is managed by a hotel or the like.

First of all, the management server and the DTV for use in a hotel under a coaxial communication environment according to one embodiment of the present invention will hereinafter be described in detail.

Under the condition that a DTV located in one independent space among a plurality of independent spaces physically separated from each other is connected to the management server through coaxial connection, the management server encodes a Transport Stream (TS) packet, multiplexes the encoded TS packet and a general broadcast signal, and transmits the multiplexed TS packet and the general broadcast signal to the DTV. However, a header of the TS packet includes at least one of ID information of the independent space, text data to be displayed, location information of the message file, and a display time period for which the text data is displayed.

Further, the message file may be configured in a XML format. For example, the message file includes at least one of information about the total number of messages contained in the message file, information for identifying whether or not displayed text data is repeated, a type of the text data, information about a location where the text data is displayed, color information of the text data, and transparency information of a background where the text data is displayed.

In the meantime, under the condition that a DTV located in one independent space among a plurality of independent spaces physically separated from each other is connected to the management server via a coaxial line, the DTV receives a TS packet, and decodes the TS packet. If ID information of the independent space defined in the TS packet header is identical to pre-stored ID information of the independent space including the DTV, the DTV extracts the message file using the location information of the message file, and stores the extracted message file. However, a header of the TS packet includes at least one of ID information of the independent space, text data to be displayed, location information of the message file, and a display time period for which the text data is displayed.

Further, the DTV determines whether a current time reaches a target time at which the text data should be displayed using the time period information. If the current time reaches the target time, the DTV displays the text data.

Therefore, according to the above-mentioned method, the differential local messaging service can be provided to individual rooms of a hotel under a coaxial communication environment.

Next, the management server and the DTV for use in a hotel under an IP communication environment according to one embodiment of the present invention will hereinafter be described in detail.

Under the condition that a DTV located in one independent space among a plurality of independent spaces physically separated from each other is connected to the management server through IP connection, the management server generates a message file including an Application Programming Interfaces (API) command and a parameter related to a display condition, and gains access to an IP address of a DTV to which the generated message file is to be transmitted. If the management server has successfully accessed to the IP address of the DTV, it transmits the generated message file to the DTV of the accessed IP address, and receives information for identifying whether the message file is successfully processed from the DTV.

Further, the message file may be configured in a XML format. For example, the message file may correspond to a command signal for displaying text data defined in the message file. The parameter related to the display condition includes at least one of information about the total number of messages contained in the message file, information for identifying whether or not displayed text data is repeated, a type of the text data, information about a location where the text data is displayed, color information of the text data, and transparency information of a background where the text data is displayed.

In the meantime, under the condition that a DTV located in one independent space among a plurality of independent spaces physically separated from each other is connected to the management server through IP connection, the DTV receives a message file including an API command and a parameter related to a display condition, and parses the received message file. If the API command contained in the parsed message file corresponds to a command signal for displaying the text data defined in the message file, the DTV displays the text data in response to the parameter, and feeds back specific information for identifying the success or failure of processing the message file to the management server.

Further, the specific information for identification is designed to include at least one of an IP address of the DTV and a DTV ID mapped to the IP address.

Therefore, according to the above-mentioned method, the differential local messaging service can be provided to individual rooms of a hotel under an IP communication environment.

The message file according to one embodiment of the present invention can be newly defined as shown in FIG. 14. Individual attributes shown in FIG. 14 will hereinafter be described in detail.

If the message is added, deleted, or changed, the value of 1 is added to the 'message_Ver' attribute, resulting in 'message_Ver attribute+1', such that 'message_Ver attribute+1' is newly distributed to each DTV. When each DTV reads the message file and the 'message_Ver' attribute is increased, the DTV reads a conventional message and newly receives a corresponding message.

The 'message_No' attribute means the total number of messages.

Attributes from the 'message_Items' attribute describes one message.

Content means displayed text data.

If the 'additionalInfo' attribute receives a key signal corresponding to the 'Enter' button among a plurality of buttons of the remote controller, it is connected to an information page of a corresponding ID from among several information pages present in a conventional DTV or STB. For example, the 'additionalInfo' attribute is linked to any of information pages (e.g., weather information page, restaurant menu page, etc.) generally used in a hotel environment or the like, such that the guest can immediately access a corresponding page while the message file is displayed.

The 'startTime' attribute means, for example, a time in 24-hour format, and the 'startDate' attribute means a date.

The 'repeat' attribute determines establishment of repetition on a basis of the 'StartTime' attribute, and 'repeatType' attribute determines the type of repetition, for example, everyday, Monday~Friday, Monday~Saturday, etc. If the 'repeat' attribute is disabled, this attribute is meaningless. At a time point at which a specific message begins to be displayed, the 'repeat=0 (non repeating)' message is deleted from an EEPROM, and 'repeat=1 (repeating)' message changes the 'startDate' attribute to another on the basis of the 'repeatType' condition. For example, if it is assumed that the 'repeatType' field indicates the range of Monday~Friday and a date of today is October $16^{th}$ (Friday), the 'startDate' attribute is changed to October $19^{th}$ (Monday) and is overwritten in an EEPROM.

The 'messageType' attribute may display a unique message. For example, the welcome message may display not only a predetermined audio/video stream but also content. The fire alarm message may inform the guest of where an emergency exit or a shelter is. If a predetermined period of time has elapsed, the fire alarm message is switched off. For another example, the 'messageType' attribute may also indicate a general message as a default.

The 'exposureSeconds' attribute may indicate an exposure time in seconds. A corresponding message is continuously displayed during the time defined in the exposureSeconds attribute, is continuously displayed until it is replaced with a new message, or is continuously displayed until a user or guest turns off this message.

The 'position' attribute may indicate an exposure location of a message.

The 'letterColor' attribute may determine an RGB-based color of a letter, and the 'BGColor' attribute may determine an RGB-based color of a background.

The 'alpha' attribute may determine transparenc.

A method for allowing the management server of a hotel or the like to manage the message file shown in FIG. 14 will hereinafter be described in detail.

The management server receives messages through various user interfaces (e.g., web interface and the like), and stores the received messages in a format of a meta data/script file.

One message file includes at least one message, and the management server may delete unnecessary messages using the time threading scheme. For example, the management server may manage (N+1) messages, where N is the total number of DTVs present in each room of a hotel or the like (that is, N is the number of messages different in individual DTVs), and the value of 1 means one common message.

In case of such messages different in individual DTVs, each message file is entitled to as 'message[serial number or room number].xml', such that it is prevented that a DTV having a different serial number or a different room number gains access to the above message file. If the above-mentioned message design is applied to the embodiment of the present invention, a message capable of being displayed only on a DTV of a specific room can be easily designed, and an identifier is added to a file name, so that an amount of load required for implementing the local messaging service environment of the present invention can be greatly reduced.

Meanwhile, differently from FIG. 14, it is possible to generate an API-based message file as shown in FIG. 15 or 16.

Particularly, FIG. 15 shows an exemplary case in which an 'BannerAttribute' information displayed on the screen of a DTV located in each room of the hotel is written in Java.

For example, the Xlet application determines attributes of a banner, such that it can generate 'BannerAttribute' information shown in FIG. 15. In addition, the Xlet application registers the generated 'BannerAttribute' information. Further, the 'BannerManager' attribute (e.g., hotel server, management server, etc.) may directly construct a banner image displayed on the display screen according to the generated 'BannerAttribute' information. For this purpose, the 'BannerAttribute' information may be implemented in a Java class.

The 'BannerManager' attribute receives the generated 'BannerAttribute' information from the Xlet application, such that it changes a status of a banner displayed on the display screen. For this purpose, the The 'BannerManager' attribute may include a plurality of Application Programming Interfaces (APIs).

In more detail, the 'BannerManager' attribute may include a status control API (setBanner) for controlling the output of the banner in response to a command received from the Xlet application and a status information API (getBanner) for indicating a current output status.

For example, there are four banner states, each of which is displayed by the above-mentioned status information API (getBanner). In more detail, the four banner states are a Not Ready state, a Ready state, an In Progress state, and a Pause state. The Not Ready state means that a banner image is not prepared yet. The Ready state means that a banner image is prepared but not yet displayed. The In-Progress state means that a banner image is displayed on the display screen. The Pause state means that displaying of a banner image is stopped.

If a user desires to display such a display image on the display screen, the application calls the BannerManager in which manner attribute information is registered, and the called BannerManager constructs a banner image using the registered banner attribute information.

For example, the Xlet application may transmit a showMessage command to the BannerManager, such that the BannerManager may display a banner image on the display screen using banner attribute information defined in the BannerAttribute field.

As described above, the hotel management server according to one embodiment of the present invention may configure a message file provided to each room in an XML format (shown in FIG. 14) or an API format (shown in FIG. 15 or 16).

Referring to FIG. 17, under a coaxial communication environment of a hotel or the like, a method for allowing the management server to transmit a message file to a DTV and a method for allowing a DTV to receive/process the message file will hereinafter be described in detail.

A hotel administrator configures a message file to be transmitted to each room in an XML format using the web interface 1510, and transmits the XML-format message file to the file system 1521 of the management server 1520.

The encoder 1522 of the management server 1520 encodes the received XML file and thus configures a TS packet. However, a header of the TS packet may include the message file name, the 'Message_Ver' attribute (shown in FIG. 14), an attribute of a pointer-to-actual message file, and an attribute of a pointer-to-end message file. The attribute of each of the pointer-to-actual message file and the pointer-to-end message file may designate an actual position of a message file in a stream.

The transmitter 1523 transmits the TS packet as a carousel stream. The modulator 1524 modulates the received carousel stream into a Radio Frequency (RF) data stream. The multiplexer 1525 multiplexes the RF data stream and a general broadcast signal (e.g., an RF A/V stream), and transmits the multiplexed result to a DTV of each room of the hotel.

The tuner 1531 of the DTV 1530 receives the encoded TS packet from the multiplexer 1525. The decoder 1532 analyzes the header of the TS packet. If the ID information of the independent space defined in the TS packet is identical to pre stored ID information of an independent space including the DTV, the XML parser 1533 extracts the message file using the location information of the message file.

In accordance with another embodiment of the present invention, a first case (1) in which the message file is either a common message or a file for accurately designating a serial number and a DTV ID of a corresponding DTV, and/or in a second case (2) in which the 'Message_Ver' attribute value is higher than an attribute value of a current message file, the system according to the embodiment of the present invention extracts a message file from a stream using the pointer-to-actual message file and the pointer-to-end-of-message file attribute, and transmits the extracted message file to the XML parser.

The XML parser 1533 extracts information stored in the message file, and stores the extracted information in the file system 1534. The display unit 1535 displays text data of the message file when the StartTime/date condition is satisfied.

Referring to FIG. 18, under an IP communication environment of a hotel or the like, a method for allowing the management server to transmit a message file to a DTV and a method for allowing a DTV to receive/process the message file will hereinafter be described in detail.

The file system 1621 of the management server 1620 of the hotel or the like generates an XML file including an API command and a parameter related to a display condition. The CPU 1622 gains access to an IP address of a DTV 1630 serving as a destination of the generated message file, using the LAN device 1623.

If the above-mentioned access was successful, the generated message file is transmitted to the LAN device 1631 of the DTV 1630 of the accessed IP address. In addition, the management server 1620 receives ID information for identifying the success or failure of processing the message file through the LAN devices 1623 and 1631.

The DTV 1630 receives a message file including an API command and a parameter related to a display condition through the LAN device 1631. The XML parser 1632 parses the received message file. If the API command contained in the parsed message file corresponds to a command signal for displaying the text data defined in the message file, the display unit 1633 displays the text data in response to the parameter, and feeds back specific information for identifying the success or failure of processing the message file to the management server through the LAN device 1631.

In other words, under the IP communication environment, the management server can manage and control respective DTVs in real time using the API call scheme. The management server can determine whether to display all messages and control display times of all the messages, such that an amount of data to be transmitted to each DTV is reduced and the DTV need not store the message file therein.

The system for use in the IP communication environment transmits XML information in the same manner as a command such that it can control the displaying of one message of each DTV, differently from the coaxial communication environment in which each DTV receives and maintains a raw message file. In addition, the system for use in the IP communication environment need not designate an ID of a target ID, and may gain directly access to an IP address of a corresponding DTV and transmit a message file (e.g., XML file).

However, the message file includes, for example, an API command and parameters related to a display condition. The API command may correspond to a command signal for displaying text data defined in the message file. The parameter related to the display condition includes at least one of information about the total number of messages contained in the message file, information for identifying whether or not displayed text data is repeated, a type of the text data, information about a location where the text data is displayed, color information of the text data, and transparency information of a background where the text data is displayed.

In the meantime, if the DTV 1630 receives the message file from the management server 1620, it extracts the API command, i.e., a command signal for displaying text data defined in the above-mentioned message file, and displays messages in response to the aforementioned parameters in real time. The DTV 1630 may transmit a response signal to the management server 1620.

The response signal may include ID information for identifying the success or failure of processing the above-mentioned message file. For example, the ID information may be 1) at least one of an IP address and a DTV ID mapped to the IP address, 2) content of text data, or 3) information indicating the success (OK) or failure (NG) of displaying the text data.

Figure 19:
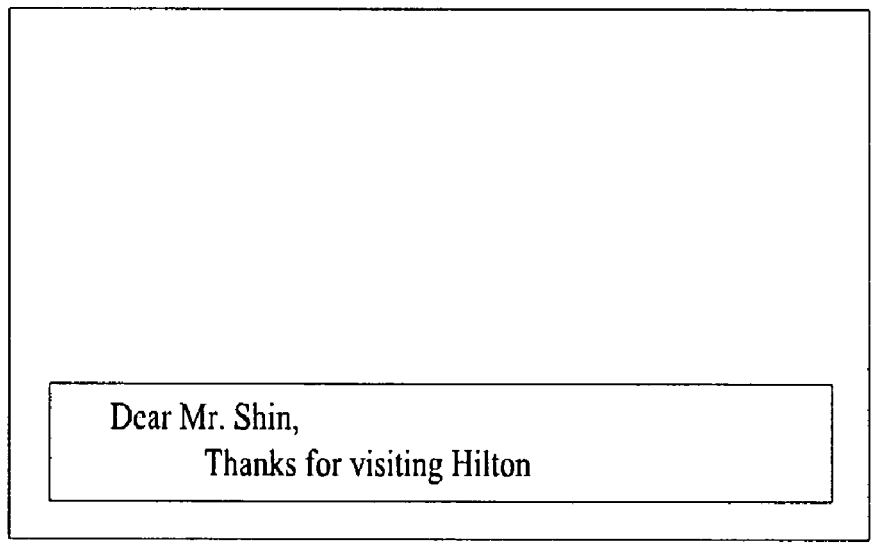
FIG. 19 illustrates a screen image for displaying content of the message file shown in FIG. 14 according to the present invention.
Figure 20:
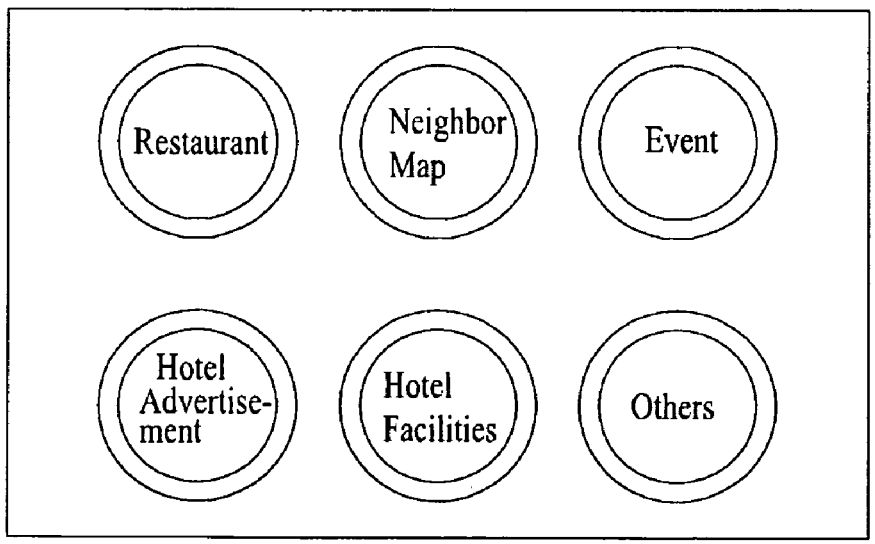
FIG. 20 illustrates primary additional information according to one embodiment of the present invention.
Figure 21:
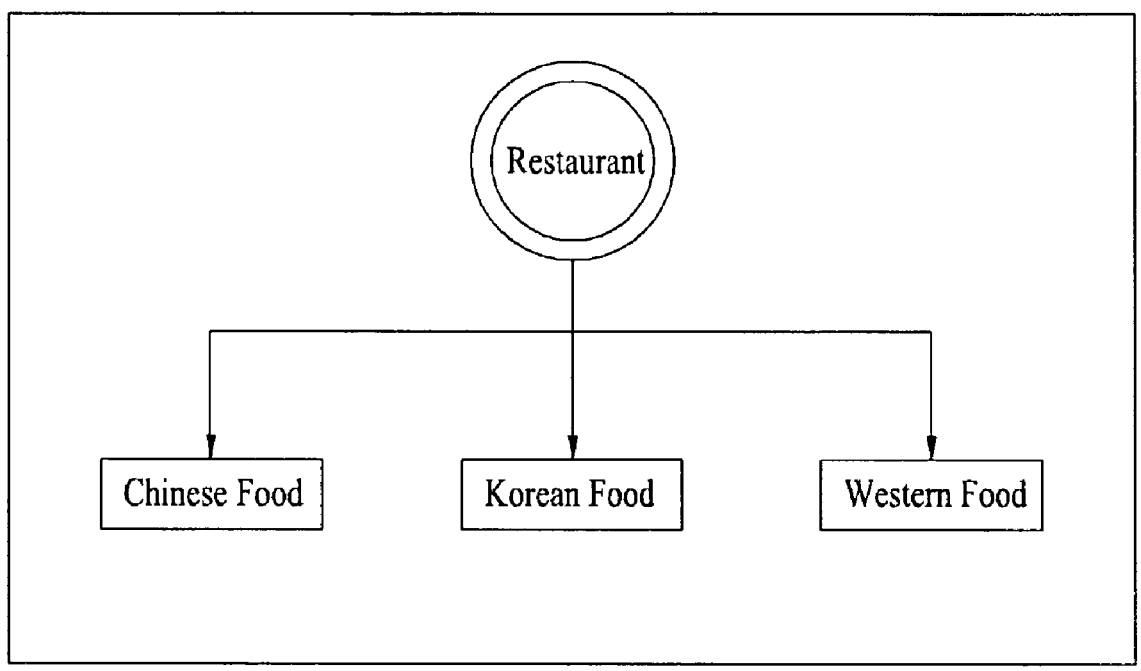
FIG. 21 illustrates secondary additional information according to one embodiment of the present invention.

FIG. 19 shows an example of a message file for implementing a local messaging service according to another embodiment of the present invention. FIG. 20 shows an example of displaying the message file content shown in FIG. 14. FIG. 21 shows an example of primary additional information according to one embodiment of the present invention. FIG. 22 shows an example of secondary additional information according to one embodiment of the present invention. A process for providing a local messaging service according to another embodiment of the present invention will hereinafter be described with reference to FIGS. 19 to 22.

Under the condition that a management server is connected to a DTV located in one independent space among a plurality of independent spaces physically separated from one another, the DTV including the AP card receives the message file shown in FIG. 14 or the message file shown in FIG. 15 or 16 from the management server. However, the management server may be managed by a hotel or the like. The message file may include ID information of the independent space and primary additional information mapped to the ID information of the independent space.

Further, the ID information of the independent space may correspond to, for example, an ID of each room belonging to one hotel. For example, the primary additional information may include at least one of hotel advertisement information, neighbor map information, restaurant information, event information reserved in the hotel, and information about hotel facilities.

Therefore, the hotel server can provide primary additional information customized for a guest of each room to a DTV of the room, such that the DTV can display the display image as shown in FIG. 20. Alternatively, if a guest of each room enters the corresponding room, the welcome message shown in FIG. 19 may also be displayed on the DTV.

In contrast, a system according to yet another embodiment of the present invention firstly determines whether the independent space ID information contained in the message file is identical to ID information of a current independent space, instead of unconditionally parsing and displaying the above-mentioned primary additional information. If the independent space ID information contained in the message file and the current independent space ID information are identical to each other, the primary additional information is displayed. Therefore, the hotel management server can provide various data services to individual rooms, and increase the protection of guest privacy.

Furthermore, the DTV according to the present invention transmits a request signal for requesting secondary additional information corresponding to the first additional information and a response signal including the above-mentioned independent space ID information to the management server. The DTV displays the secondary additional information received from the management server as shown in FIG. 21. Although FIG. 21 shows only secondary additional information corresponding to the restaurant item as an example of the above-mentioned primary additional information, the DTV according to the present invention may also transmit a request signal for requesting secondary additional information corresponding to other items (e.g., neighbor map, event, and hotel facility items) and a response signal including the above-mentioned independent space ID information to the management server, and the management server may provide the secondary additional information to the DTV in response to the request signal and the independent space ID information. Subsequently, the management server may also provide not only a signal for requesting third additional information related to secondary additional information, but also another signal for requesting third additional information related to a response signal including the independent space ID information to the DTV corresponding to the independent space ID information. For example, although not shown in the drawing, if the guest of the hotel room selects the Chinese Food item, names and locations (addresses) of the principal Chinese restaurants may be provided to the DTV. Moreover, as well as information about the neighbor map, event, and hotel facilities, transportation and weather information may be further added to the DTV.

When the hotel management server provides additional information to a DTV of each room and receives a response signal from each room of the hotel, the hotel management server stores ID information of each room. As a result, the hotel management server can also process different request signals from several rooms. Therefore, the interactive service can be achieved between the DTV located in each room of the hotel and the management server, the management server need not initially transmit heavy data to all DTVs of the hotel, and can provide more detailed information related to guest-requested information to the guest. Technically, the AP card contained in the DTV is designed to convert data of cable modem type into data of IP type.

Therefore, the system according to the embodiment of the present invention provides the messaging interface between the DTV of each room of the hotel and the management server, such that the hotel administrator or hotelier can differentially provide various messages to respective rooms.

Regardless of a physical communication environment of the hotel (e.g., coaxial communication environment or IP communication environment), the system according to the embodiment of the present invention can implement the local messaging service in the hotel. Furthermore, the welcome message may be automatically transmitted to each guest through the PMS server or the like, or a function for providing information about food menus to the guest may be easily added to the system. In addition, the system may interoperate with a GEM broadcast system, such that it can recognize detailed information about the corresponding message using the GEM application.

In the meantime, the product invention and the process invention have been disclosed in the present invention, and the product invention may be complementary to the process invention as necessary.

The method disclosed in the present invention may be implemented in the form of program commands executable by a variety of computer means, and recorded on a computer-readable recording medium.

The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler.

The above-stated hardware devices may be configured to operate as one or more software modules to perform the operation of the present invention, and vice versa. Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

As apparent from the above description, the present invention provides a technology for automatically generating customized service information, and provides the customized service information to a guest who uses a hotel or the like. In addition, the present invention can provide a technology for providing the customized service information and at the same time improving security.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a digital television (DTV) located in one independent space among a plurality of independent spaces physically separated from one another, wherein the DTV is connected to a management server through a coaxial connection, the method comprising:
receiving a Transport Stream (TS) packet from the management server, wherein a header of the TS packet includes at least one of identification (ID) information of the independent space, text data to be displayed, location information of the message file, and a display time period for which the text data is displayed;
decoding the TS packet;
extracting the message file using the location information of the message file, if the independent space ID information defined in the header of the TS packet is identical to pre-stored ID information of the independent space including the DTV; and
storing the extracted message file;
determining whether a current time reaches a target time at which the text data should be displayed using the display time period; and
displaying the text data if the current time reaches the target time.

2. A method for controlling a management server that is connected to a digital television (DTV) through an Internet Protocol (IP) connection, wherein the DTV is located in one independent space among a plurality of independent spaces physically separated from one another, the method comprising:
generating a message file including an Application Programming Interfaces (API) command and a parameter related to a display condition, wherein the message file is configured in a XML format;
accessing an IP address of a DTV serving as a destination of the generated message file, if a current time reaches a target time at which the message file should be displayed according to the parameter related to the display condition;
transmitting, if the accessing is successfully achieved, the generated message file to the DTV having the accessed IP address; and
receiving information for identifying whether the message file is successfully processed from the DTV,
wherein the parameter related to a display condition includes at least one of information about the total number of message contained in the message file, information for identifying whether or not displayed text data is repeated, a type of the text data, information about a location where the text data is displayed, color information of the text data, and transparency information of a background where the text data is displayed.

3. A method for controlling a digital television (DIV) located in one independent space among a plurality of independent spaces physically separated from one another correspond to several rooms contained in one building, wherein the DTV is connected to a management server through an Internet Protocol (IP) connection, the method comprising:
  receiving a message file including an Application Programming Interfaces (API) command, a parameter related to a display condition, ID information of the independent space and first additional information mapped to the ID information of the independent space, wherein the first additional information is customized for a user of the independent space and associated with services provided from the building;
  determining whether the ID information of the independent space contained in the message file is identical to ID information of a current independent space;
  parsing the received message file, if the ID information of the independent space contained in the message file and ID information of the current independent space are identical each other;
  displaying, if the API command contained in the parsed message file corresponds to a command signal for displaying text data defined in the message file, the text data in response to the parameter;
  transmitting information for identifying whether the message file is successfully processed to the management server, wherein the information for identifying includes at least one of an IP address of the DTV and a DTV ID mapped to the IP address;
  requesting a secondary additional information corresponding to the first additional information using the ID information of the current independent space, wherein the secondary additional information is associated with specific service provided from the building according to user selection for the first additional information; and
  displaying the secondary additional information received from the management server.

* * * * *